US008253789B2

(12) United States Patent
Aizaki et al.

(10) Patent No.: US 8,253,789 B2
(45) Date of Patent: Aug. 28, 2012

(54) MICROSCOPIC IMAGE CAPTURING APPARATUS, MICROSCOPIC IMAGE CAPTURING METHOD, AND STORAGE MEDIUM HAVING A MICROSCOPE IMAGE CAPTURING PROGRAM STORED THEREON

(75) Inventors: Shinichiro Aizaki, Tokyo (JP); Junzo Sakurai, Tokyo (JP); Jitsunari Kojima, Tokyo (JP)

(73) Assignee: Olympus Corporation, Tokyo (JP)

( * ) Notice: Subject to any disclaimer, the term of this patent is extended or adjusted under 35 U.S.C. 154(b) by 383 days.

(21) Appl. No.: 12/702,965

(22) Filed: Feb. 9, 2010

(65) Prior Publication Data
US 2010/0188497 A1    Jul. 29, 2010

Related U.S. Application Data

(62) Division of application No. 10/924,594, filed on Aug. 23, 2004, now abandoned.

(30) Foreign Application Priority Data

Aug. 25, 2003  (JP) ................................ 2003-300080

(51) Int. Cl.
    *H04N 9/47*      (2006.01)
(52) U.S. Cl. ........................................................ 348/79
(58) Field of Classification Search .................. 348/79, 348/345; 358/461; 382/275
    See application file for complete search history.

(56) References Cited

U.S. PATENT DOCUMENTS

| 6,665,093 | B2 |   | 12/2003 | Lee |  |
|-----------|-----|---|---------|-----|---|
| 6,704,457 | B1 | * | 3/2004  | Sugiura | 382/274 |
| 7,518,757 | B2 | * | 4/2009  | Chizawa et al. | 358/461 |
| 2002/0003908 | A1 | * | 1/2002 | Kijima et al. | 382/274 |
| 2003/0016301 | A1 | * | 1/2003 | Aizaki et al. | 348/345 |
| 2003/0016398 | A1 | * | 1/2003 | Soeda | 358/461 |
| 2003/0039402 | A1 | * | 2/2003 | Robins et al. | 382/275 |

FOREIGN PATENT DOCUMENTS

| EP | 0 920 192 A2 | 6/1999 |
| EP | 1 280 334 A | 1/2003 |
| JP | 60-199279 A | 10/1985 |

(Continued)

OTHER PUBLICATIONS

European Office Action dated Mar. 23, 2011 (in English) in counterpart European Application No. 04 020 180.8.

(Continued)

*Primary Examiner* — Sath V Perungavoor
*Assistant Examiner* — James Pontius
(74) *Attorney, Agent, or Firm* — Holtz, Holtz, Goodman & Chick, PC

(57) ABSTRACT

In a correction data storing unit of a digital camera which captures a microscopic image, image data of a light image without a sample, image data obtained by using a filter for removing a defective portion for the light image without a sample, image data where a region without being corrected (or a region being corrected) is set in the light image without the sample, and shading correction data calculated from image data obtained by setting a mask region where data after being corrected is set to 0 are stored. An operator obtains, captures, records, and stores an observation image satisfactory for great-looking by using arbitrary shading correction data. In this way, a captured image satisfactory for great-looking is obtained by making a suitable shading correction according to a shading characteristic, which is caused by an optical system.

9 Claims, 17 Drawing Sheets

FOREIGN PATENT DOCUMENTS

| | | |
|---|---|---|
| JP | 06-062243 A | 3/1994 |
| JP | 8-307674 A | 11/1996 |
| JP | 08-340558 A | 12/1996 |
| JP | 10-013667 A | 1/1998 |
| JP | 2001-292369 A | 10/2001 |

OTHER PUBLICATIONS

Spring, K.R. et al., "Basic concepts in Digital Image processing" [Online], Jan. 28 2003, XP002379792, Retrieved from the Internet: URL: http://web.archive.org/web/2003162185214; http://www.micro.magnet.fsu.edu/primer/digitalimaging/imageprocessingintro.html; [retrieved on May 5, 2006].

Japanese Office Action dated Mar. 31, 2009 (3 pages), and English translation thereof (4 pages), issued in counterpart Japanese Application Serial No. 2003-300080.

* cited by examiner

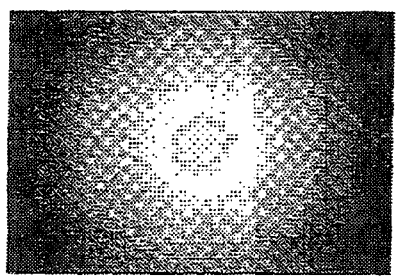
FIG. 1A
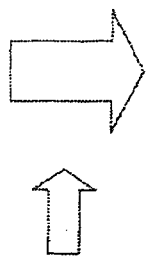
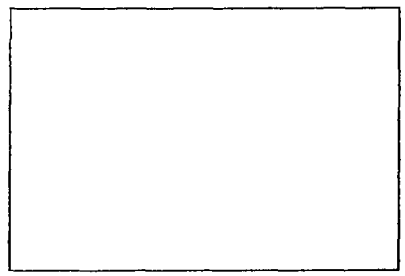
FIG. 1C
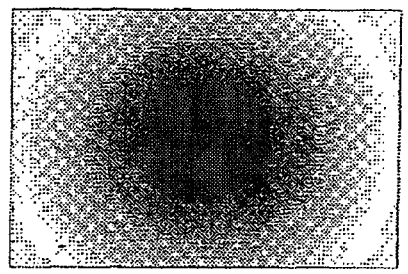
FIG. 1B
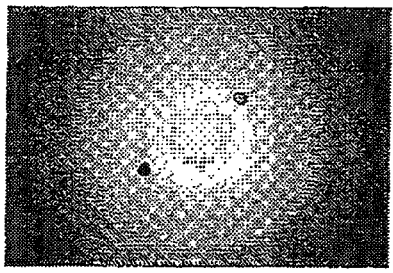
FIG. 1D
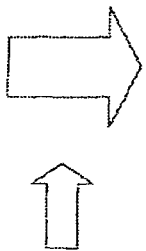
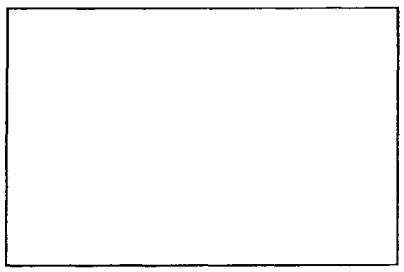
FIG. 1F
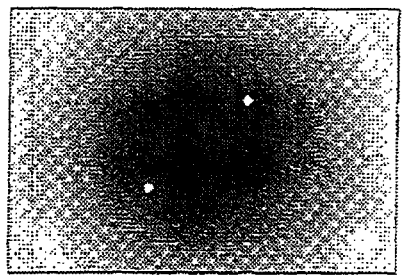
FIG. 1E

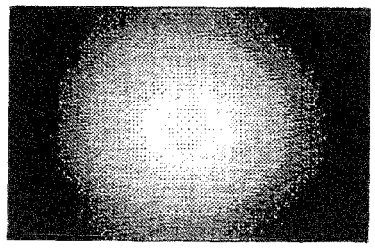
F I G. 2 A
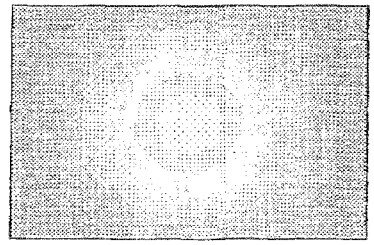
F I G. 2 C
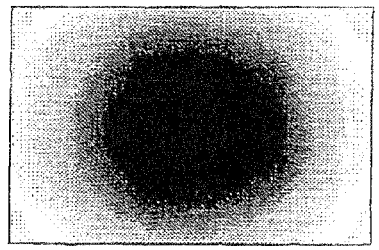
F I G. 2 B
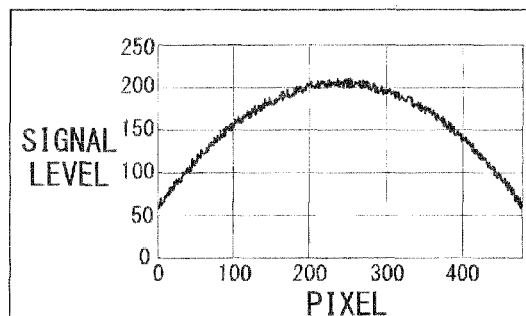
F I G. 2 D
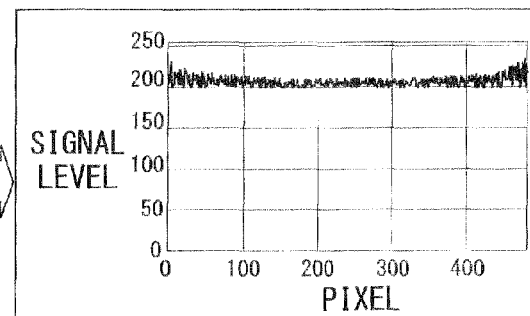
F I G. 2 F
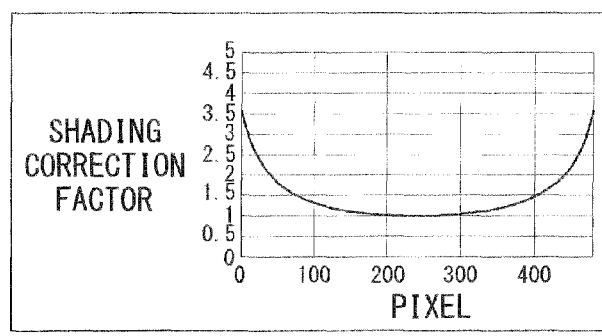
F I G. 2 E

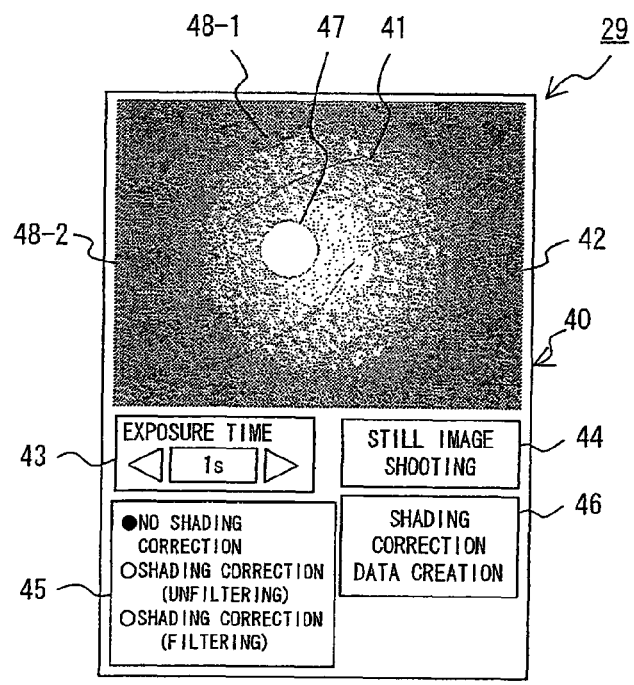
F I G. 6 A
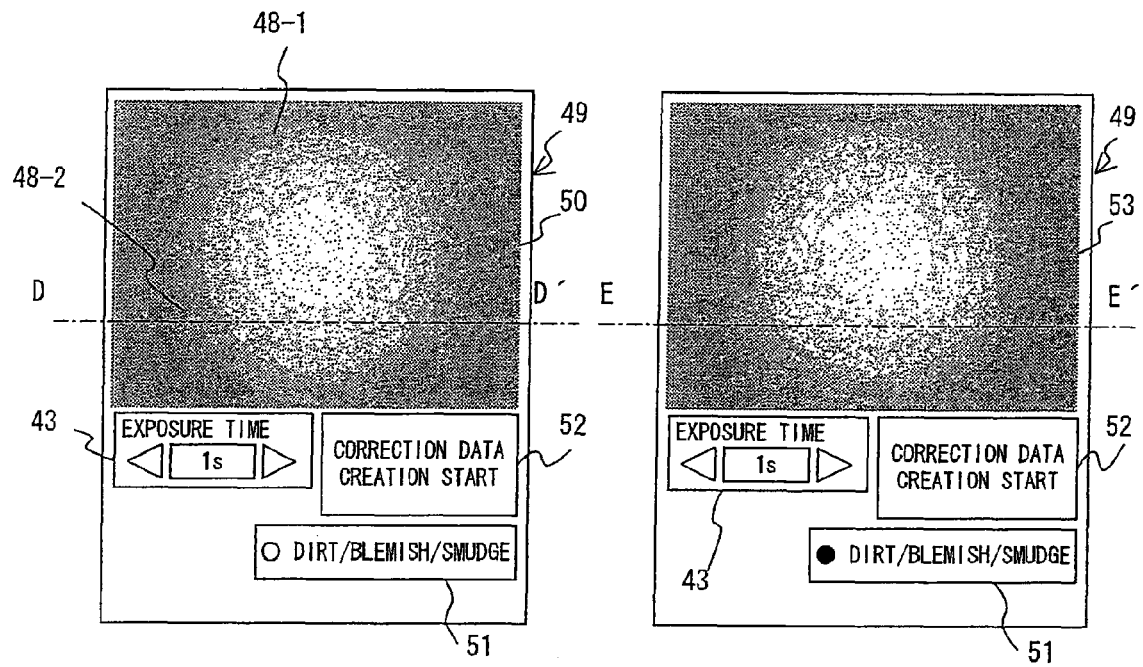
F I G. 6 B              F I G. 6 C

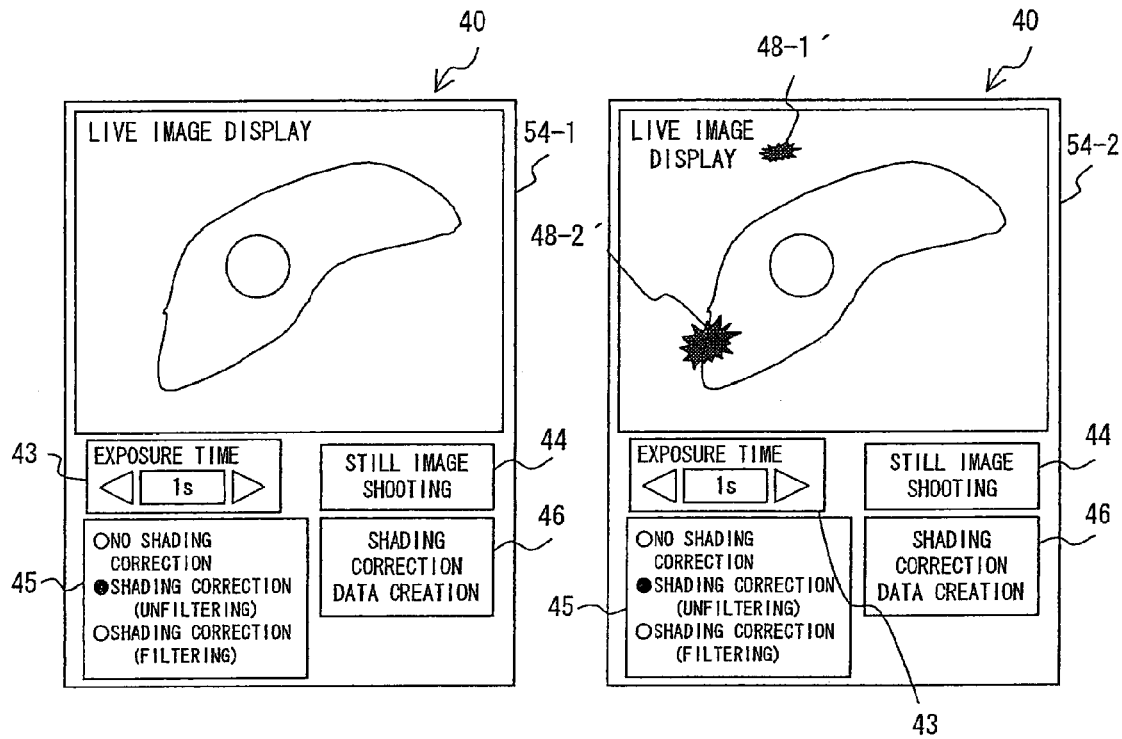
F I G. 8A   F I G. 8B
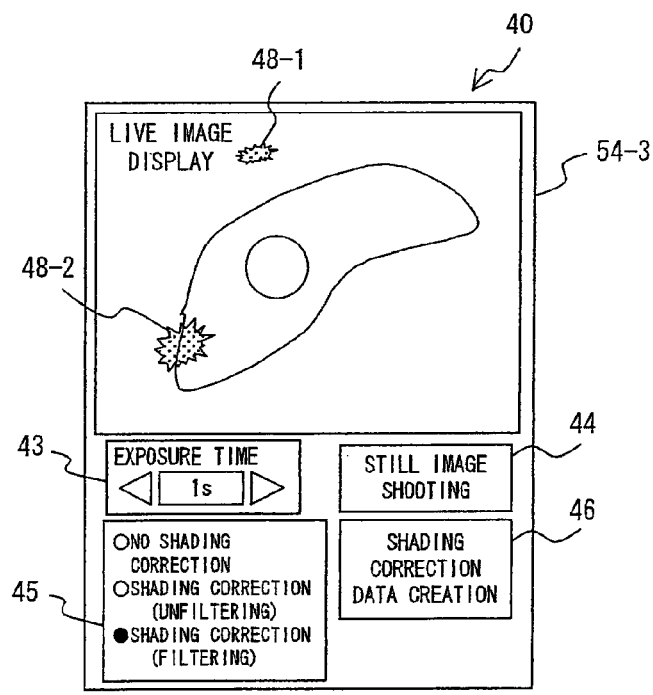
F I G. 8C

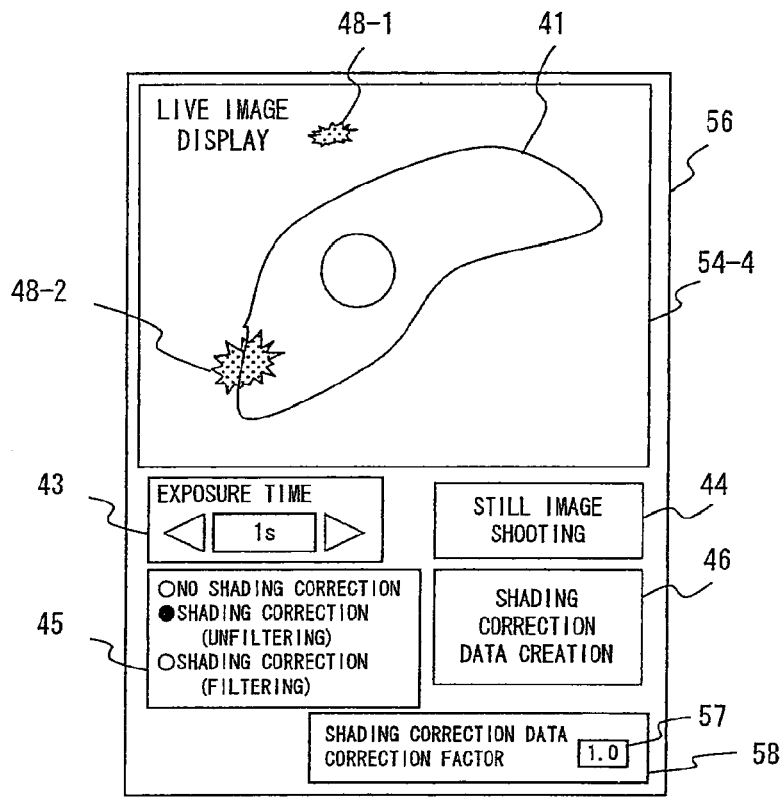
F I G. 1 0 A
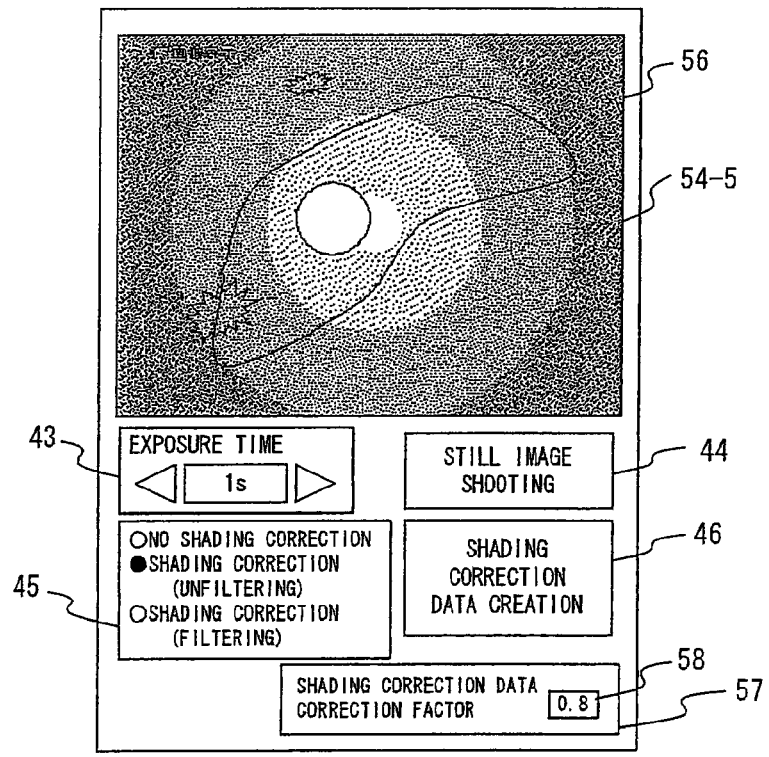
F I G. 1 0 B

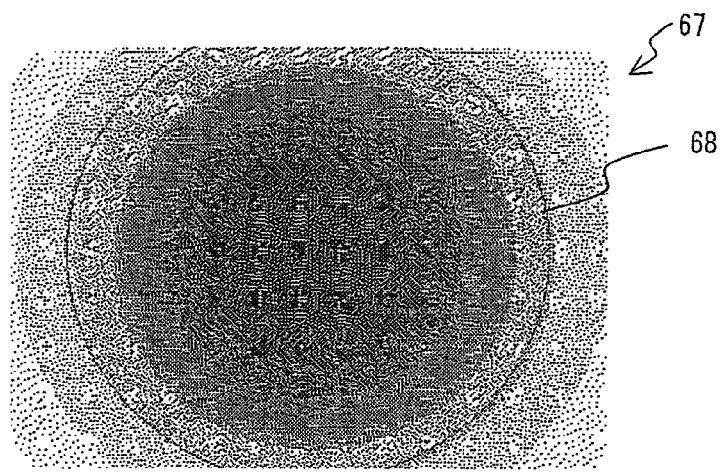
F I G. 1 2 A
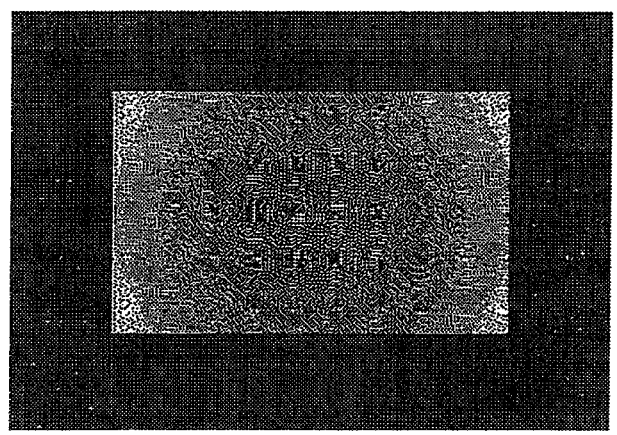
F I G. 1 2 B
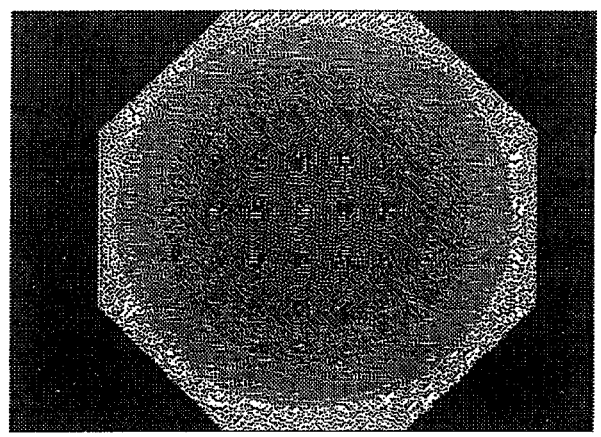
F I G. 1 2 C

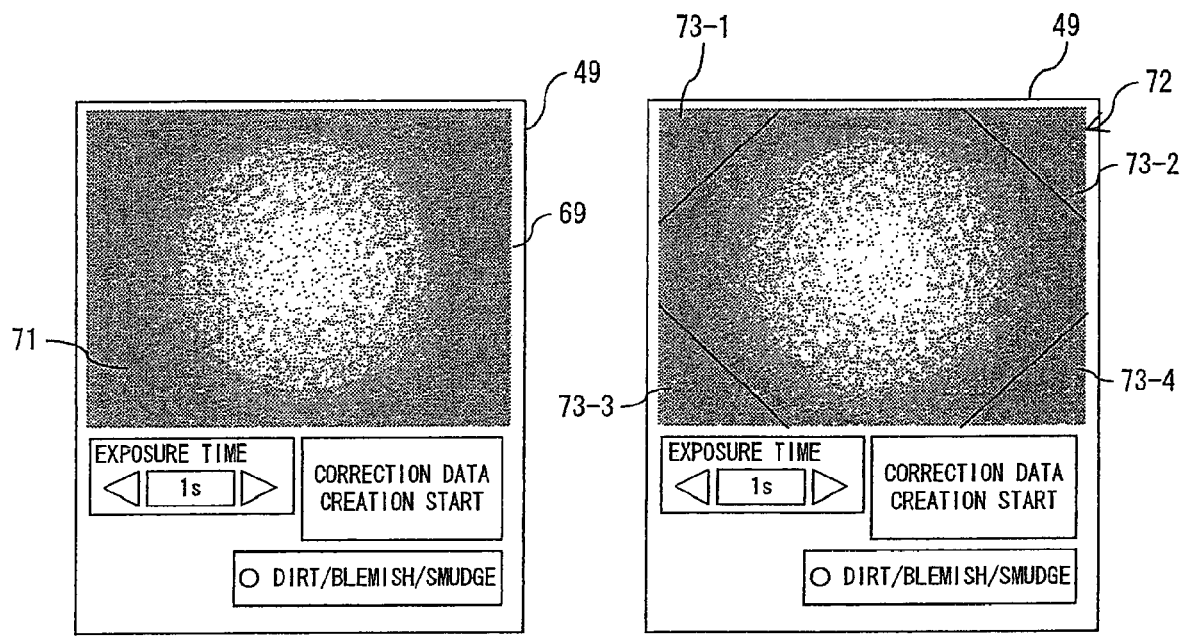
FIG. 13A          FIG. 13B
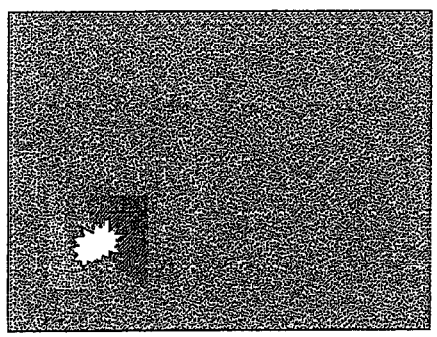     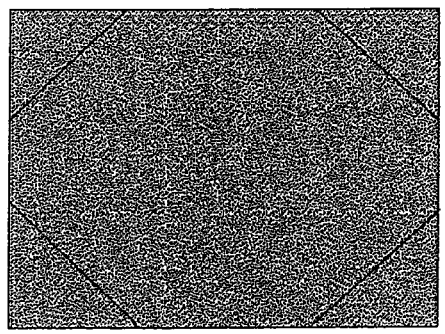
FIG. 13C          FIG. 13D

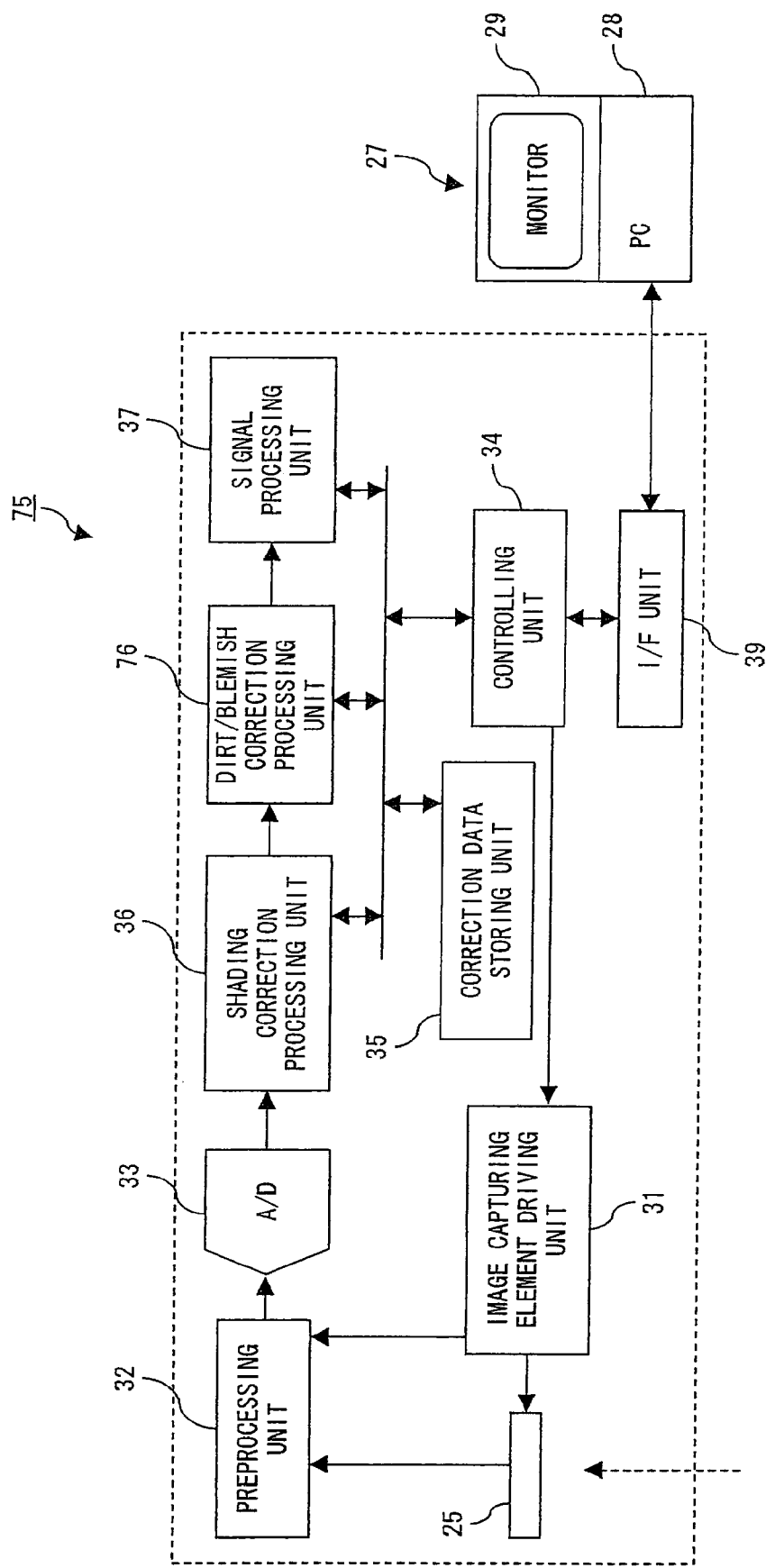
F I G. 14

MICROSCOPIC IMAGE CAPTURING APPARATUS, MICROSCOPIC IMAGE CAPTURING METHOD, AND STORAGE MEDIUM HAVING A MICROSCOPE IMAGE CAPTURING PROGRAM STORED THEREON

CROSS REFERENCE TO RELATED APPLICATION

The present application is a Divisional Application of U.S. application Ser. No. 10/924,594 filed Aug. 23, 2004 now abandoned, which is based upon and claims the benefit of priority from prior Japanese Application No. 2003-300080, filed Aug. 25, 2003, the entire contents of both of which are incorporated herein by reference.

BACKGROUND OF THE INVENTION

1. Field of the Invention

The present invention relates to a microscopic image capturing apparatus, a microscopic image capturing method, and a storage medium recording a microscopic image capturing program, which shoot a sample image of a microscope by using an image capturing element such as a CCD, etc., and more particularly, to a microscopic image capturing apparatus, a microscopic image capturing method, and a storage medium recording a microscopic image capturing program, which store shading correction data created based on an externally input condition, and execute a shading correction process based on the shading correction data.

2. Description of the Related Art

Conventionally, a shading correction method and an image reading device, which modify read image data by making a shading correction for the read image data in order to remove noise superposed on the image data read by the image reading device used in a facsimile, a copier, an image scanner, etc., are known (for example, see paragraphs [0021] to [0028], and FIGS. 1 and 2 of Japanese Patent Publication No. HEI08-307674).

In the meantime, with a microscope, an enlarged light image of a sample was simply observed with an eyepiece lens in the past. However, in recent years, with a microscope, image data has been obtained by shooting an enlarged light image of a sample with an image capturing device, and the obtained image data has been displayed and observed on a display screen of an external device in many cases.

In such a case, an optical member such as an objective lens, a condenser lens, a TV adapter, etc, is replaced with a wide range of variations depending on an observation magnification of a microscope or an observation method in order to make an observation. At this time, a satisfactory shading characteristic cannot be always obtained due to a decrease in a marginal amount of light depending on a combination of an image capturing device and an optical member on the microscope side. If the above described shading correction is made for image data obtained by being shot with an image capturing device in such a case, a correction for the decrease in the marginal amount of light, etc., and noise removal can be made.

FIGS. 1A to 1F explain the above described conventional shading correction made to a captured microscopic image. For example, when a light image which is only illuminated without placing a sample on a stage (light image without a sample) is shot with a microscope, a phenomenon that the light image gradually becomes darker toward a marginal portion of the image as shown in FIG. 1A occurs as an undesirable shading characteristic.

If such a shading characteristic is left unchanged, also a sample image captured by placing the sample on the stage results in a similar image. Therefore, a shading correction process is executed in order to improve such a shading characteristic. To execute the shading correction process, shading correction data is first created.

The shading correction data is obtained by dividing the maximum value of pixel values within the image shown in FIG. 1A by each pixel value. If the largeness/smallness of the value of each pixel of the shading correction data is represented by light and dark, the data becomes the one shown in FIG. 1B, in which a dark portion in a central portion has, for example, a value "1", and bright portions at the four corners have, for example, a value "1.5". As described above, shading correction data is calculated from an image obtained by capturing a light image which is only illuminated without placing a sample in the capturing of a microscope image.

The pixel values of the image shown in FIG. 1A are multiplied by this shading correction data, so that the image can be converted into an image having even brightness as shown in FIG. 1C. Accordingly, also image data obtained from a sample image, which is acquired by capturing the image of a sample placed on a stage, can be converted into sample image data having even brightness with the shading correction process using the above described shading correction data.

Additionally, in a microscope, dirt, a blemish, a smudge, etc. sometimes occurs in an optical member on an optical path. If a light image without a sample is captured as described above in such a case, an image shown in FIG. 1D is obtained. Defective portions of two points in a bright portion in a central portion are noise caused by dirt, a blemish, a smudge, etc.

If shading correction data is calculated from the image data shown in FIG. 1D in order to execute the shading correction process for the image shown in FIG. 1D, the shading correction data becomes the one shown in FIG. 1E. If the shading correction process is executed for the image data shown in FIG. 1D by using this shading correction data, the image data can be converted into a perfect image of FIG. 1F, from which noise is removed, and which has even brightness.

Also in this case, the shading correction process using the above described shading correction data is executed for image data obtained by capturing the image of a sample placed on the stage, whereby the image data can be converted into sample image data from which noise is removed and which has even brightness.

However, if the sample is actually shot, and the correction process using the shading correction data is executed, the image which should be converted into an image having even brightness is not properly corrected to an image having even brightness. Additionally, a phenomenon that one piece of dirt is corrected and disappears from the image, but another piece of dirt is not corrected occurs. Besides, the quality of the image in the peripheries of the dirt sometimes deteriorates because of the correction.

FIGS. 2A to 2F explain a problem caused by the conventional shading correction made to a captured microscopic image.

As described above, a satisfactory shading characteristic cannot be always obtained in the capturing of a microscopic image because optical members arranged on an optical path of a microscope widely vary. For example, if a decrease in a marginal amount of light is significant as shown in FIG. 2A, the value of the marginal portion of the image in the shading correction data sometimes becomes as large as "2" or "3" as shown in FIG. 2B.

At this time, also the noise of the image after the shading correction process is executed becomes twice or three times in comparison with the image before being processed. The image after being processed, which is shown in FIG. 2C, is an image where the amount of noise in the image is represented by light and dark. In this figure, there is a problem that the quality of the entire image deteriorates due to an increase in the noise although the shading shown in FIG. 2A is corrected.

FIGS. 2D, 2E, and 2F explain a cause for the above described problem. All of FIGS. 2D, 2E, and 2F indicate the signal levels of image data or correction data when pixels are scanned in the middle of the screens shown in FIGS. 2A, 2B, and 2C from the left to the right in the horizontal direction.

As shown in FIG. 2D, the signal level of the original image data including noise (indicated by a jaggy in this figure) indicates a normal value in the neighborhood of a level 200 in the middle portion, but gradually goes down toward the left and the right, and decreases to approximately "56" at both ends.

In the meantime, a shading correction data thus calculated and shown in FIG. 2E, namely, a value corresponding to each pixel gradually increases toward the left and the right from the middle portion that is defined as 1, and indicates a value of approximately "3.6" at both ends in the example shown in FIG. 2E.

If a correction is made by multiplying the respective pixel values of the image data signal shown in FIG. 2D by the shading correction factor, the signal level becomes almost constant in the neighborhood of the normal value of 200 as a whole as shown in FIG. 2F. However, also noise levels at both ends are corrected upward (3.6 times in the example shown in FIG. 2F) along with the signal levels of the image, and an image signal having large noise is formed as a result. This makes the entire image shown in FIG. 2C, especially, the marginal portion of the image deteriorate.

FIGS. 3A, 3B, and 3C explain another problem caused by the conventional shading correction made to a captured microscopic image. Under the optical system shown in FIG. 1D, for example, if image data 3 is obtained by placing a sample of a cell 2 having a nucleus 1 on a stage, and by capturing the image of the sample with a camera as shown in FIG. 3A, the defective portions 4 (4-1, 4-2) of 2 points caused by dirt, a blemish, a smudge, etc., which are shown in FIG. 1D, appear in the image data 3.

In this case, if a correction is made by multiplying shading correction data 5 which is similar to that in the case of FIG. 1E, the defective portions 4 (4-1, 4-2) of the two points should disappear from the image data after being corrected. However, a problem that the upper defective portion 4-2 disappears, but the lower defective portion 4-i still remains occurs as in the image data after being corrected 6 in FIG. 3C.

This is because the degrees of influences received by the defective portions of the two points (such as dirt, a blemish, a smudge, etc.), which are captured without the sample, from the sample differ due to the positions, the sizes, etc. of the two pieces of dirt on the optical path when the observation image is captured with the sample, and accordingly, the levels of brightness of the defective portions of the 2 points differ due to a difference between states where the images of the dirt are formed on the light image of the sample, so that a portion which cannot be corrected with the shading correction data created by being calculated from the light image without the sample is considered to occur.

As described above, it is empirically proved that a satisfactory image is not always obtained in the capturing of a microscopic image even if a shading correction is made by applying the conventional technique unchanged.

SUMMARY OF THE INVENTION

A microscopic image capturing apparatus in a first aspect of the present invention is a microscopic image capturing apparatus comprising a microscope obtaining a light image with a sample illuminated by a light source, which exists within a viewing field, and a light image without the sample removed from the viewing field, which is captured in a state of being illuminated only by the light source, with an objective lens arranged as opposed to the sample, and a digital camera which is attached to the microscope and captures the light images obtained by the microscope, the digital camera comprising an A/D converting unit A/D-converting an image signal of each of the captured light images, a shading correction processing unit executing a shading correction process for digital image data converted by the A/D converting unit, a correction data storing unit storing shading correction data used when the shading correction process is executed by the shading correction processing unit, and a controlling unit, wherein: the correction data storing unit stores first shading correction data obtained based on image data of the light image without the sample, which is acquired by capturing the light image without the sample with the image capturing unit, in correspondence with a selection of non-removing dirt, a blemish, or a smudge, and second shading correction data obtained based on an image, which is acquired by using a median filter for the image data of the light image without the sample captured by the image capturing unit in correspondence with a selection of removing dirt, a blemish, or a smudge; and the controlling unit sets selected shading correction data in the shading correction processing unit from the correction data storing unit in correspondence with an externally input selection of using one of the first and the second shading correction data, when the shading correction process is executed for a image data of the light image with the sample obtained by capturing the light image with the sample with the image capturing unit.

A microscopic image capturing apparatus in a second aspect of the present invention is a microscopic image capturing apparatus comprising a microscope obtaining a light image with a sample illuminated by a light source, which exists within a viewing field, and a light image without the sample removed from the viewing field, which is captured in a state of being only illuminated by the light source, with an objective lens arranged as opposed to the sample, and a digital camera which is attached to the microscope and captures the light images obtained by the microscope, the digital camera comprising an A/D converting unit A/D-converting an image signal of each of the captured light images, a shading correction processing unit executing a shading correction process for digital image data converted by the A/D converting unit, a correction data storing unit storing shading correction data used when the shading correction process is executed by the shading correction processing unit, and a controlling unit, wherein the correction data storing unit stores shading correction data obtained by making a calculation based on image data of the light image without the sample, which is acquired by capturing the light image without the sample with the image capturing unit, and a restriction value set for the shading correction data.

A microscopic image capturing apparatus in a third aspect of the present invention is a microscopic image capturing apparatus comprising a microscope obtaining a light image with a sample illuminated by a light source, which exists within a viewing field, and a light image without the sample removed from the viewing field, which is captured in a state of being only illuminated by the light source, with an objective lens arranged as opposed to the sample, and a digital camera which is attached to the microscope and captures the light images obtained by the microscope, the digital camera comprising an A/D converting unit A/D-converting an image signal of each of the captured light images, a shading correction processing unit executing a shading correction process for digital image data converted by the A/D converting unit, a correction data storing unit storing shading correction data used when the shading correction process is executed by the shading correction processing unit, and a controlling unit, wherein the controlling unit makes the correction data storing unit store data, which is obtained by using an average value filter for shading correction data, as final shading correction data, after the shading correction data is created from image data of the light image without the sample obtained by capturing the light image without the sample with the image capturing unit, and correction data except for a specified region in the shading correction data is replaced with 1, when the region to which the shading correction is to be made is specified in the image obtained by capturing the light image without the sample with the image capturing unit.

A microscopic image capturing method according to a fourth invention of the present invention is a microscopic image capturing method in a digital camera, which is attached to a microscope, capturing a light image with the sample where the light image of the sample is within a viewing field, and light image without a sample, from which the sample is removed and which is only illuminated by the light source, within the viewing field of an objective lens, the light images being obtained by the microscope with the objective lens arranged as opposed to the sample illuminated by the light source, generating digital image data by A/D (analog/digital) converting an image signal of each of the captured light images, and executing a shading correction process by using shading correction data prestored in a correction data storing device for the digital image data of the light image with the sample, comprising storing, in the correction data storing device, shading correction data obtained by making a calculation based on image data of the light image without the sample, which is obtained by capturing the light image without the sample with the digital camera, and a restriction value set for the shading correction data.

A microscopic image capturing method in a fifth aspect of the present invention is a microscopic image capturing method in a digital camera, which is attached to a microscope, capturing a light image with the sample where the light image of the sample is within a viewing field, and light image without a sample, from which the sample is removed and which is only illuminated by the light source, within the viewing field of an objective lens, the light images being obtained by the microscope with the objective lens arranged as opposed to the sample illuminated by the light source, generating digital image data by A/D (analog/digital) converting an image signal of each of the captured light images, and executing a shading correction process by using shading correction data prestored in a correction data storing device for the digital image data of the light image with the sample, comprising storing data, which is obtained by using an average value filter for shading correction data, in the correction data storing device as final shading correction data, after the shading correction data is created from the image data of the light image without the sample obtained by capturing the light image without the sample with the digital camera, and correction data except for a specified region in the shading correction data is replaced with 1, when the region to which the shading correction is to be made is specified in the image obtained by capturing the light image without the sample with the digital camera, in the shading correction process.

BRIEF DESCRIPTION OF THE DRAWINGS

FIGS. 1A to 1F are schematics explaining a conventional shading correction made to a captured microscopic image;

FIGS. 2A to 2F are schematics explaining a problem caused by the conventional shading correction made to the captured microscopic image;

FIGS. 6A, 6B, and 6C are schematics respectively exemplifying a shading correction data creation initial operation screen displayed on a monitor of a PC connected to the digital camera in the microscopic image capturing apparatus according to the first preferred embodiment;

FIGS. 8A and 8B are schematics exemplifying a light image with a sample, to which a correction based on unfiltered shading correction data is made, in the microscopic image capturing apparatus according to the first preferred embodiment, FIG. 8C is a schematic showing a display example where an image is displayed by being eased/relieved (?) when the display image has a problem;

FIG. 10A is a schematic exemplifying an operation screen in a microscopic image capturing apparatus according to a third preferred embodiment;

FIG. 10B is a schematic showing a display image after a shading correction process is executed;

FIGS. 12A, 12B, and 12C are schematics showing modification examples of shading correction data creation in the microscopic image capturing apparatus according to the fourth preferred embodiment;

FIGS. 13A and 13B are schematics respectively exemplifying a shading correction data creation execution screen in a fifth preferred embodiment;

FIGS. 13C and 13D are schematics respectively showing created shading correction data;

FIG. 14 is a block diagram showing a rough configuration of a digital camera which configures a microscopic image capturing apparatus according to a sixth preferred embodiment;

DESCRIPTION OF THE PREFERRED EMBODIMENTS

Hereinafter, preferred embodiments according to the present invention are described with reference to the drawings.

First Preferred Embodiment

Figure 3A:
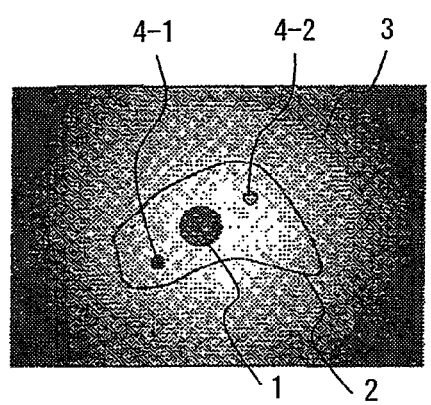
FIGS. 3A, 3B, and 3C are schematics explaining another problem caused by the conventional shading correction made to the captured microscopic image.
Figure 3C:
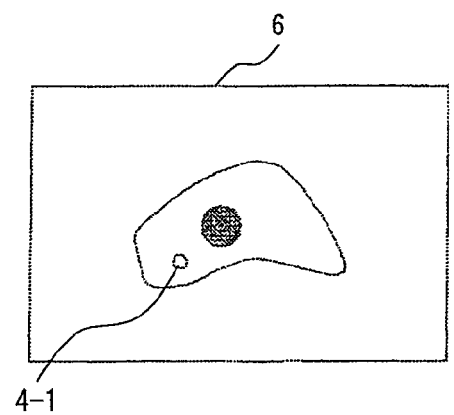
Figure 3B:
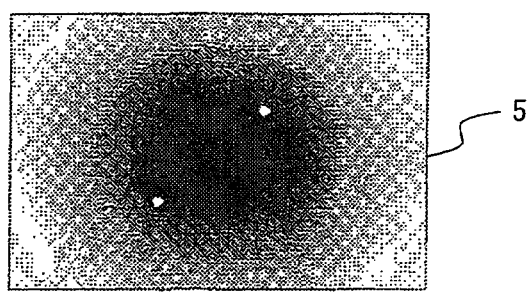
Figure 4:
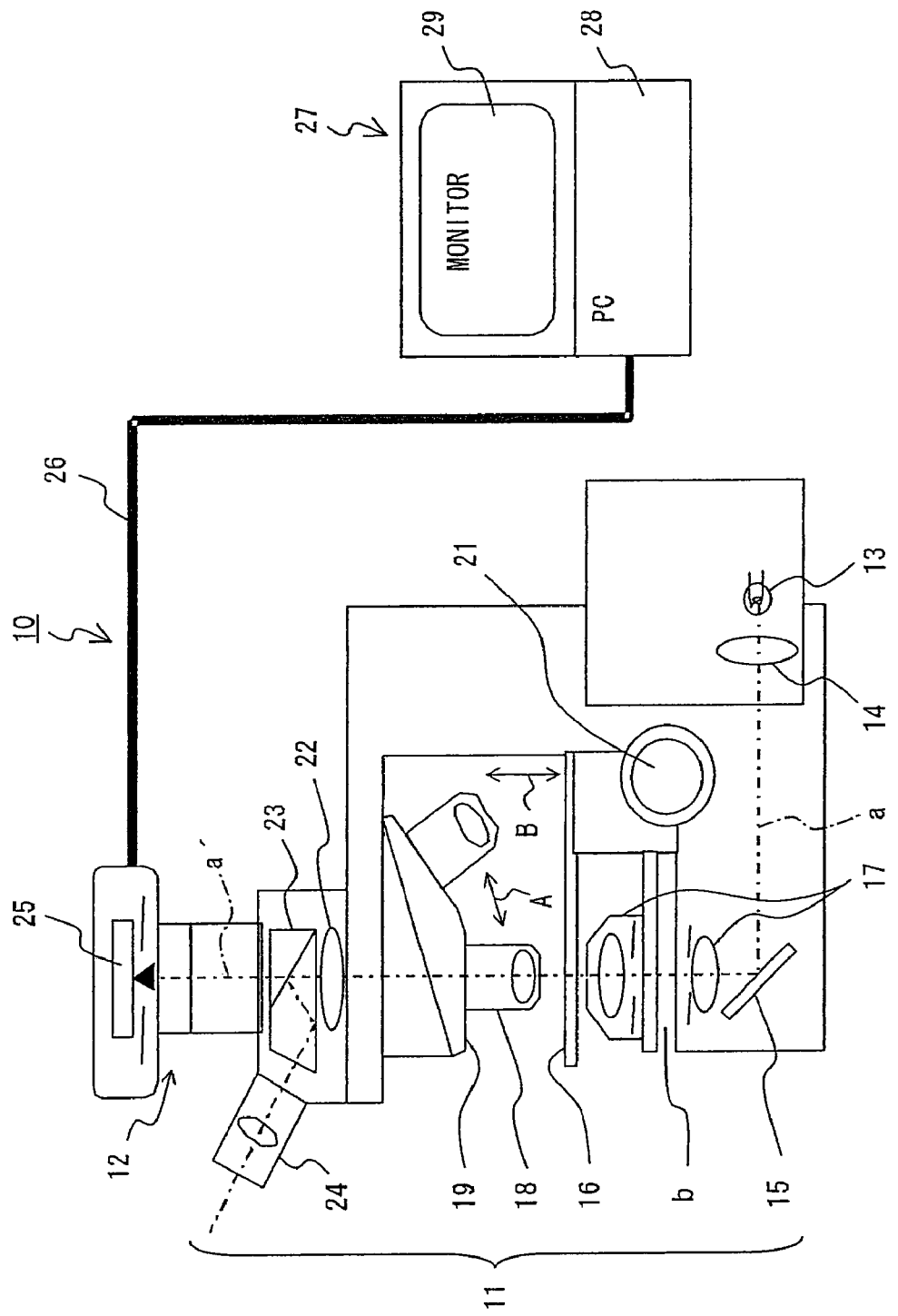
FIG. 4 is a schematic showing a rough configuration of a microscopic image capturing apparatus according to a first preferred embodiment.

FIG. 4 is a schematic showing a rough configuration of a microscopic image capturing apparatus according to a first preferred embodiment. As shown in this figure, a microscopic image capturing apparatus 10 is configured by a microscope 11, and a digital camera 12.

The microscope 11 generates illumination light from a transmission illumination light source 13 configured, for example, by a halogen lamp. This illumination light is first collected by a collector lens 14 as indicated by a one-dot chain line a shown in FIG. 4, then passes through various types of filters, a field stop, etc., which are not shown, and is deflected by a mirror 15 in the direction of a stage 16.

The illumination light deflected by the mirror 15 in the direction of the stage 16 passes through a condenser lens unit 17 composed of an aperture stop and two lenses, and further passes through an illumination opening, which is not shown, of the stage 16, so that the light illuminates a sample on a slide glass, which is not shown, on the stage 16.

A revolver 19 holding a plurality of objective lenses 18 is arranged above the stage 16. The revolver 19 is rotated in an arbitrary one of forward and backward directions as indicated by a bidirectional arrow A shown in FIG. 4, whereby the positions of the objective lenses 18 implementing desired magnifications are changed to an observation position.

Additionally, these objective lenses 18 can be replaced by being freely attached/detached to/from the revolver 19. Accordingly, a desired magnification can be also obtained not only by rotating the revolver 19, but also by replacing the objective lenses 18 by attaching/detaching to/from the revolver 19.

Furthermore, a driving device 21 can drive the above described stage 16 to rise and fall in upward and downward directions as indicated by a bidirectional arrow B in order to enable a focus control to be performed. As a matter of course, the focus control is not limited to the driving of the stage 16 to rise and fall. It goes without saying that the focus control can be performed by making the revolver 19, which holds the objective lenses 18, rise and fall in upward and downward directions.

After the image of the sample on the slide glass, namely, a "light image with a sample" to be described later (if the sample on the slide glass on the stage 16 is removed, the image is referred to as a "light image without a sample" as will be described later), which is incident in this way to the objective lens 18 positioned on an optical axis a' within the observation optical path, passes through an intermediate magnification lens 22, it is split by a beam splitter unit 23 into two directions such as a direction toward an eyepiece lens unit 24 and a direction toward the digital camera 12, and guided. The light image guided to the digital camera 12 is formed on a reception plane of an image capturing element 25 configured by a CCD (Charge Coupled Device), etc. included in the digital camera 12.

The digital camera 12, which will be described in detail later, comprises an interface (I/F) unit for making a transmission/reception to/from an external host device, and is connected to an I/F unit, which is not shown, of a main body 28 of a PC (Personal Computer) 27, which is the external host device, from the interface (I/F) unit via a communications cable 26.

The PC 27 comprises a keyboard, a pointing device, etc., for making an input, which are not shown and connected to the main body 28, in addition to a display device (monitor) 29 shown in this figure.

Figure 5:
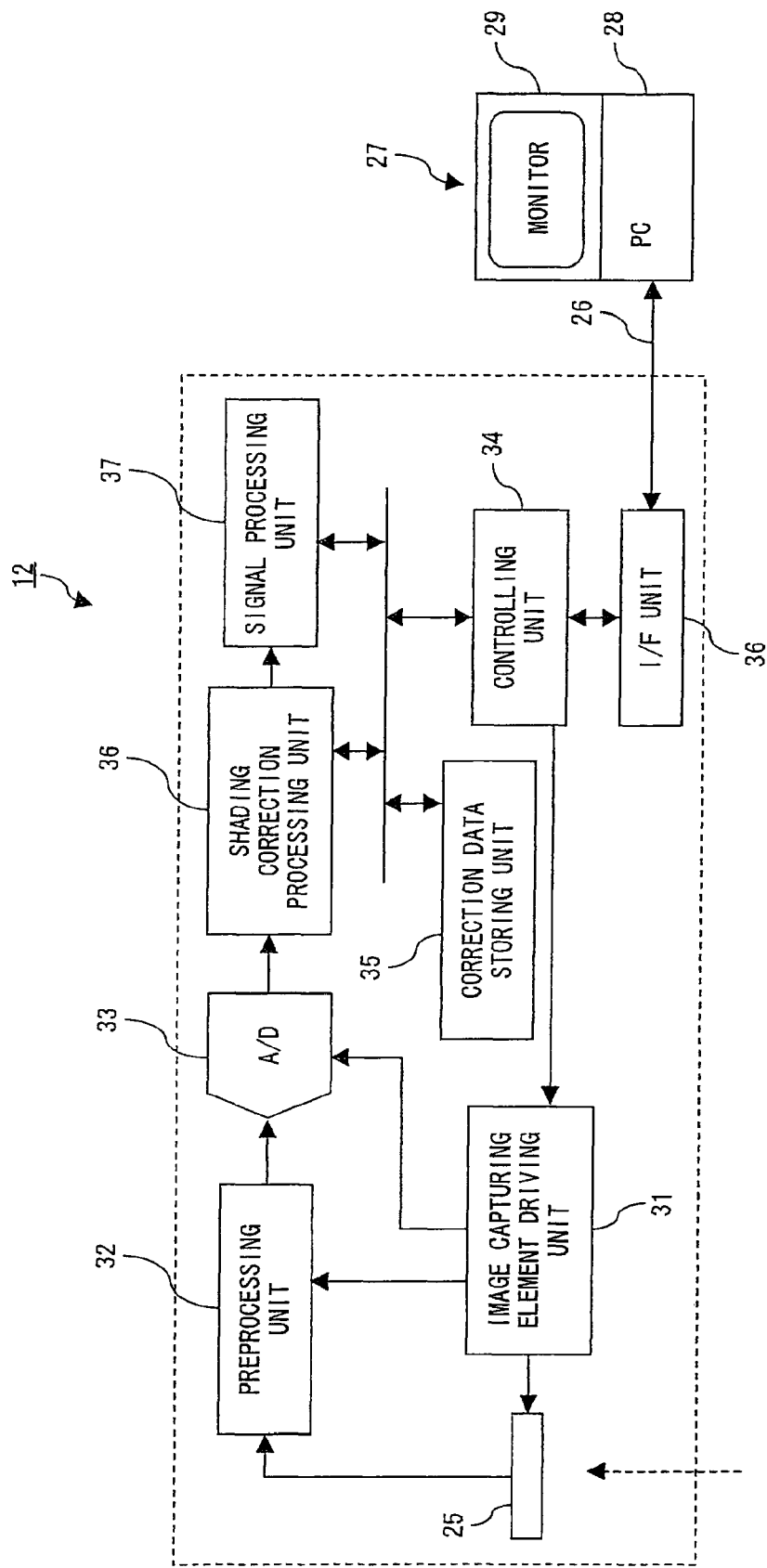
FIG. 5 is a block diagram showing a rough configuration of a digital camera in the microscopic image capturing apparatus according to the first preferred embodiment.

FIG. 5 is a block diagram showing a rough configuration of the above described digital camera 12. In the digital camera 12 shown in this figure, the image capturing element 25 also shown in FIG. 4 is driven in an exposure time based on a driving signal from an image capturing element driving unit 31, and outputs light image-formed on the reception plane to a preprocessing unit 32 as an analog electric output signal. The preprocessing unit 32 puts the signal output from the image capturing element 25 into a video image signal, and outputs the signal to an A/D converting unit 33 according to a control pulse provided from the image capturing element driving unit 31. The A/D converting unit 33 digitizes the signal output from the preprocessing unit 32 based on a clock signal output from the image capturing element driving unit 31.

A controlling unit 34 reads correction data from a correction data storing unit 35, and sets the read correction data in a shading correction processing unit 36. The shading correction processing unit 36 makes a shading correction by multiplying each of pixels of the image data, which is digitized by the A/D converting unit 33, by the correction data with a method similar to the above described conventional technique.

For the image data to which the shading correction is made, a white balance process, a color process, a gradation process, and an edge enhancement process are further executed by a signal processing unit 37.

Additionally, to the controlling unit 34, the PC 27 is connected via the I/F unit 39 and the communications cable 26 as described above. The image data processed by the signal processing unit 37 is transferred to the PC 27. The PC 27 comprises functions for displaying the transferred image on the monitor 29, for recording the image data in an internal storage device, and for operating the digital camera 12, etc.

FIGS. 6A, 6B, and 6C are schematics respectively exemplifying a shading correction data creation initial operation screen displayed on the monitor 29 of the PC 27. On the shading correction data creation initial operation screen 40 shown in FIG. 6A, a live image screen 42 (hereinafter referred to also as a light-image-with-sample screen) of a sample 41, which is image-captured with the digital camera 12, is widely displayed in the upper portion, and an exposure time adjustment button 43, a still image shooting button 44, a shading correction setting button 45 for switching the settings of a shading correction, and a shading correction creation button 46 for creating shading correction data are displayed in an operation input region below the live image screen.

In the display example of the light-image-with-sample screen 42, which is shown in FIG. 6A, the sample 41 in the central portion is a sample of a cell having a nucleus 47. On the entire screen, a large circular bright portion in the central portion, and a shading portion where brightness gradually becomes darker from the margin of the bright portion toward the edge of the screen are integrally displayed. Additionally, defective portions 48 (48-1, 48-2) of dirt, a blemish, etc. are superposed and displayed in two portions such as an upper central portion, and a lower left portion.

Here, if an operator of the PC 27 presses the still image shooting button 44, the same image data as the live image screen 42 displayed on the shading correction data creation initial operation screen 40 based on the settings of the exposure time and the shading correction, which are set with the other buttons is transferred to the PC 27 as still image data. Then, the transferred image data is stored in a memory or on a hard disk of the PC 27.

Shading correction data creation in this preferred embodiment is described next. The above described light-image-with-sample screen 42, which is shown in FIG. 6A, indicates a state where the sample 41 is observed without making a shading correction.

If the slide glass of the sample 41 is removed form the stage 16 in this state, and the shading correction data creation button 46 is pressed, the display screen switches to a shading correction data creation execution operation screen 49 shown in FIG. 6B.

On the shading correction data creation execution operation screen 49, an image with only illumination 50 (hereinafter referred to also as a light-image-without-sample screen) for creating correction data, which will be described later, is displayed, and an exposure time adjustment button 43, a check button 51 for selecting whether or not to remove a defective portion of dirt, a blemish, a smudge, etc., and a correction data creation start button 52 for instructing the start of creation of correction data are displayed in an operation input region below the light-image-without-sample screen 50.

In the display example of the light-image-without-sample screen 50, which is shown in FIG. 6B, a video image obtained by removing the sample 41 from the light-image-with-sample screen 42, which is shown in FIG. 6A, is displayed unchanged. Namely, the two defective portions 48 (48-1, 48-2) also superposed and displayed on the light-image-with-sample screen 42, which is shown in FIG. 6A, are displayed.

Entities that form the defective portions 48 are dirt, a smudge, etc., which intrude from a gap b formed in the condenser lens unit 17 shown in FIG. 4 and are adhered to the lens surface, or are sometimes a blemish in the lens itself.

Here, if the operator presses the correction data creation start button 52 without checking the check button 51, namely, without specifying the removal of dirt, a blemish, etc., correction data is created for the illumination image (unfiltered light-image-without-sample screen 50), which is shown in FIG. 6A and includes the dirt, the smudge, the blemish, etc. The created correction data is stored in the correction data storing unit 35 of the digital camera 12 as unfiltered shading correction data. The display screen is then restored to the shading correction data creation initial operation screen 40 shown in FIG. 6A.

In the meantime, if the operator checks the check button 51, namely, if the operator specifies the removal of the dirt, the blemish, etc., an image only with illumination 53, which is obtained by using a median filter outputting a median value of a pixel region, for example, of neighboring pixels of 5×5 for the image data transferred from the digital camera 12, is displayed on the shading correction data creation execution operation screen 49 as shown in FIG. 6C. The image only with illumination 53, which is shown in FIG. 6C, is a "filtered light-image-without-sample screen", on which only shading remains in a state where the dirt, the blemish, etc. is removed by the median filter.

If the operator presses the correction data creation start button 52 in this state, correction data is created for the above described image only with illumination (filtered light-image-with-sample screen) 53 of FIG. 6C, from which the dirt, the blemish, etc. is removed, is created. The created correction data is stored in the correction data storing unit 35 of the digital camera 12 as filtered shading correction data. Then, the display screen is restored to the operation screen shown in FIG. 6A.

FIGS. 7A to 7D are schematics respectively showing the course of a process during which the above described shading correction data is created in the form of a signal. FIGS. 7A to 7D respectively indicate pixel positions in a main scanning direction on a horizontal axis, and the signal levels of pixels on a vertical axis.

Figure 7A:
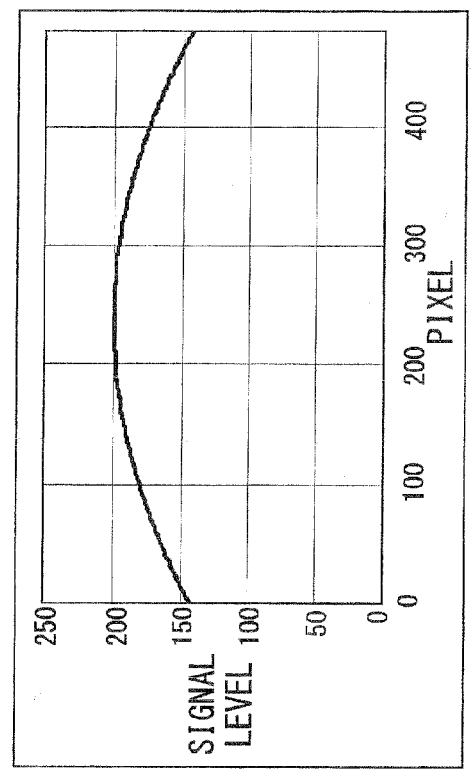
FIG. 7A to 7D are schematics respectively showing the course of a process, during which shading correction data is created, in the form of a signal in the microscopic image capturing apparatus according to the first preferred embodiment.
Figure 7B:
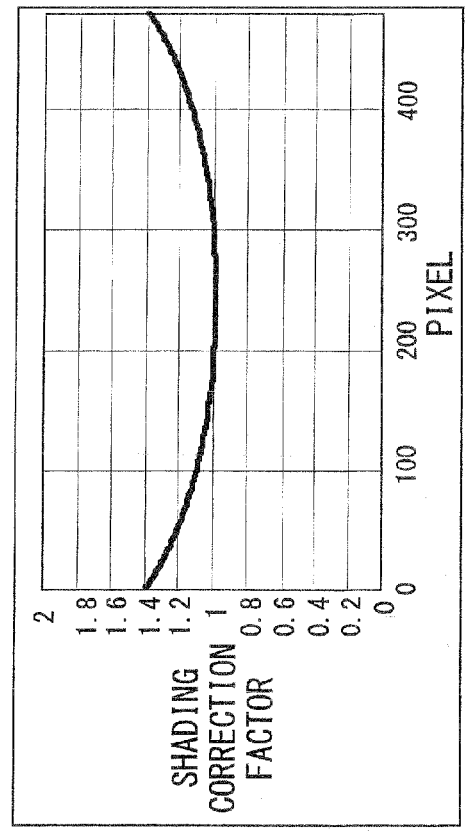

FIG. 7A shows a image data scanning signal in a D-D' portion of the illumination image (unfiltered light-image-without-sample screen) 50 including the dirt, the smudge, the blemish, etc. in FIG. 6B, whereas FIG. 7B shows a image data scanning signal in an E-E' portion of the image only with illumination (filtered light-image-without-sample screen) 53, which is shown in FIG. 6c and from which the dirt, the blemish, etc. is removed.

Figure 7C:
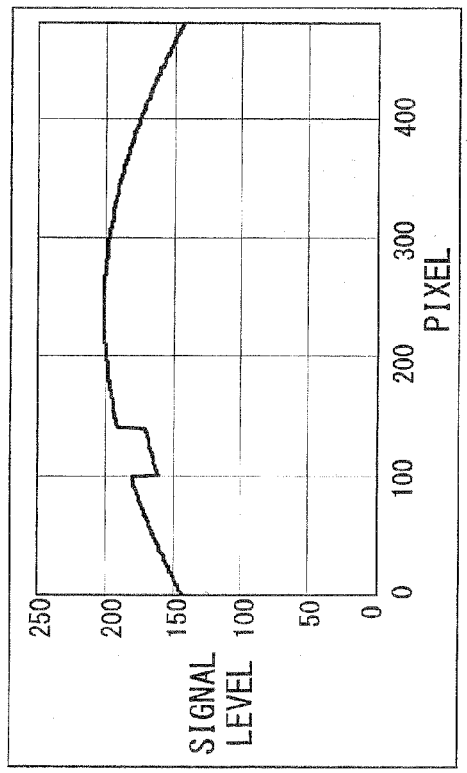

FIG. 7C shows the shading correction data corresponding to the above described D-D' portion of the unfiltered shading correction data which is created for the unfiltered light-image-without-sample screen 50, which is shown in FIG. 6B, and stored in the correction data storing unit 35 of the digital camera 12.

Figure 7D:
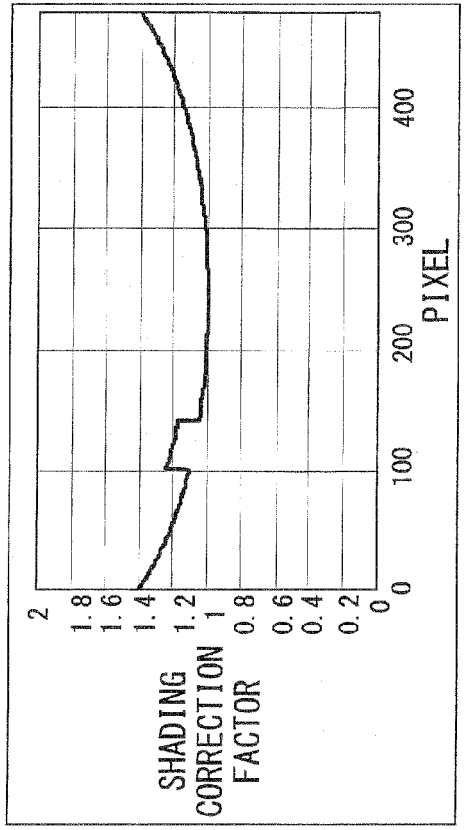

FIG. 7D shows the shading correction data corresponding to the above described E-E' portion of the filtered shading correction data which is created for the filtered light-image-without-sample screen 53 shown in FIG. 6C, and stored in the correction data storing unit 35 of the digital camera 12.

In this preferred embodiment, the image only with illumination (the unfiltered light-image-without-sample screen 50) is shot with the digital camera each time correction data is created. However, image data once shot may be recorded onto the hard disk of the PC 27 as an image file, and the image file may be read and used to create correction data.

A shading correction process in this preferred embodiment is described next. Since the shading correction setting button 45 in the lower portion is set to "no shading correction" on the light-image-with-sample screen 42 on the above described shading correction data creation initial operation screen 40 shown in FIG. 6A, the sample image where the shading appears unchanged is displayed.

Here, if "shading correction (unfiltering)" of the shading correction setting button 45 is checked, the unfiltered shading correction data (see FIG. 7C) stored in the correction data storing unit 35 is set in the Shading correction processing unit 36 via the controlling unit 34 of the digital camera 12, and an image data correction is made based on the unfiltered shading correction data by the shading correction processing unit 36.

FIGS. 8A and 8B respectively show a display example of a light-image-with-sample screen, to which the image data correction based on the above described unfiltered shading correction data is made. FIG. 8C shows a display example where an image is displayed by being alleviated when the display image has a problem.

As described above, when the image data correction based on the unfiltered shading correction data is made as described above, the corrected image data is output from the I/F unit 39 of the digital camera 12 to the PC 27, and the corrected image data is displayed as the corrected live image screen on the shading correction data creation initial operation screen 40 of the monitor 29, the defective portions 48 of the dirt, the blemish, the smudge, etc., which are shown in FIG. 6B, sometimes disappear by being corrected along with the shading like the corrected live image screen (corrected light-image-with-sample screen) 54-1 shown in FIG. 8A, or sometimes become more conspicuous than those in the uncorrected image like the corrected live image screen 54-2 shown in FIG. 8B depending on the positions or the sizes of the dirt, the blemish, the smudge, etc. on the optical path as described above.

The operator of the microscopic image capturing apparatus 10 determines a difference between these images, and shoots a still image if the images are in the state shown in FIG. 8A. Or, if the images are in the state shown in FIG. 8B, the operator checks "shading correction (filtering)" of the shading correction setting button 45.

As a result, the filtered shading correction data (see FIG. 7D) stored in the correction data storing unit 35 is set in the shading correction processing unit 36 via the controlling unit 34 of the digital camera 12, and an image data correction based on the filtered shading correction data is made by the shading correction processing unit 36.

Consequently, the image where only the shading is corrected without correcting the defective portions 48 (48-1, 48-2) of the dirt, the blemish, the smudge, etc. is displayed as the corrected live image screen 54-3 on the shading correction data creation initial operation screen 40 as shown in FIG. 8C.

As described above, according to this preferred embodiment, the operator of the microscopic image capturing apparatus 10 can execute a suitable shading correction process implementing a great-looking image by selecting whether or not to use a filter according to the nature/degree of appearance of a defective portion of dirt, a blemish, a smudge, etc., which is superposed on an observation image displayed on the monitor 29, whereby a sample image with higher quality can be obtained.

Second Preferred Embodiment

A second preferred embodiment is described next. A configuration of a microscopic image capturing apparatus according to the second preferred embodiment is the same as those shown in FIGS. 4 and 5.

FIGS. 9A to 9D are schematics explaining shading correction data creation, and a shading correction process in the microscopic image capturing apparatus according to the second preferred embodiment.

The shading correction data creation in this preferred embodiment is described first.

Figure 9A:
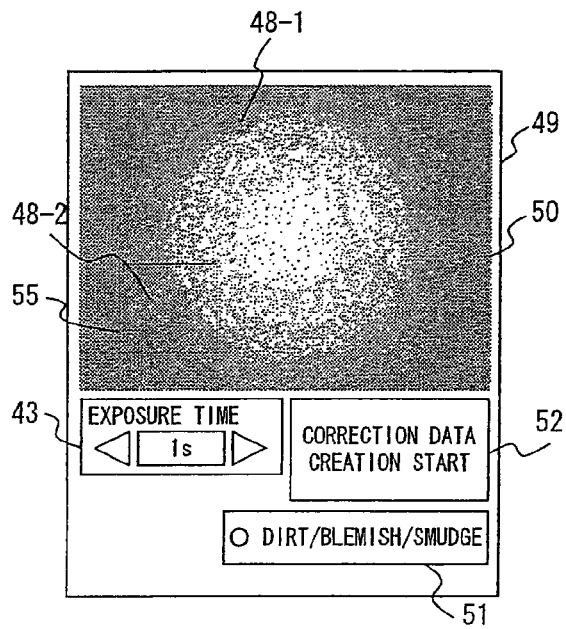
FIGS. 9A to 9D are schematics explaining shading correction data creation, and a shading correction process in a microscopic image capturing apparatus according to a second preferred embodiment.

In the shading correction data creation in this preferred embodiment, a region for which a median filter process is not executed can be specified when the removal of dirt, a blemish, etc. is specified by checking the check button 51 for selecting whether or not to remove dirt, a blemish, etc. on a shading correction data creation execution operation screen 49 shown in FIG. 9A.

To implement this, a region for which the removal of dirt, a blemish, etc. is not to be made is specified with a pointing device such as a mouse, etc. in a state where the check button 51 is not checked, namely, in a state where the median filter is not used as shown in FIG. 9A. In the example shown in FIG. 9A, a rectangular region 55, which is slightly wider than a region including the defective portion 48-2, is specified.

Figure 9B:
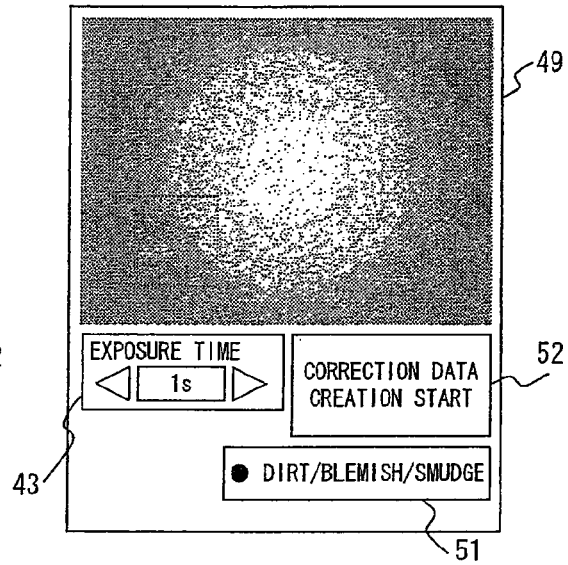

If the check button 51 is checked in this state, the median filer process is executed for an image only with illumination 50 from which the rectangular region 55 is excluded, and its result is displayed on the shading correction data creation screen 49 as shown in FIG. 9B.

If the correction data creation start button 52 is pressed in this state, correction data is created for the image (from which a frame indicating the rectangular region is removed) shown in FIG. 9B, and the created correction data is stored in the correction data storing unit 35 of the digital camera 12 as specified-region-filtered shading correction data.

Even if a region from which dirt, a blemish, etc. is not removed is specified, shading correction data creation is made in a similar manner as in the first preferred embodiment (see FIG. 7C) if the check button 51 is not checked, and the correction data creation start button 52 is pressed.

A shading correction process executed in this preferred embodiment is described next. The shading correction process in this preferred embodiment is preferable when a plurality of pieces of dirt, blemishes, etc. having different natures exist.

Figure 9C:
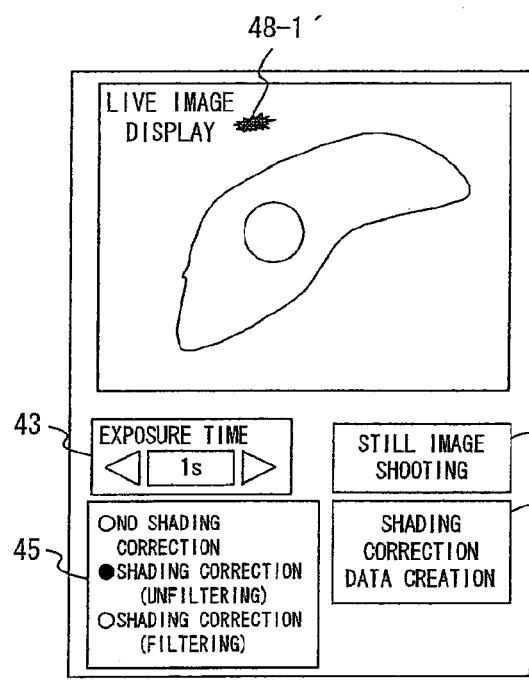
Figure 9D:
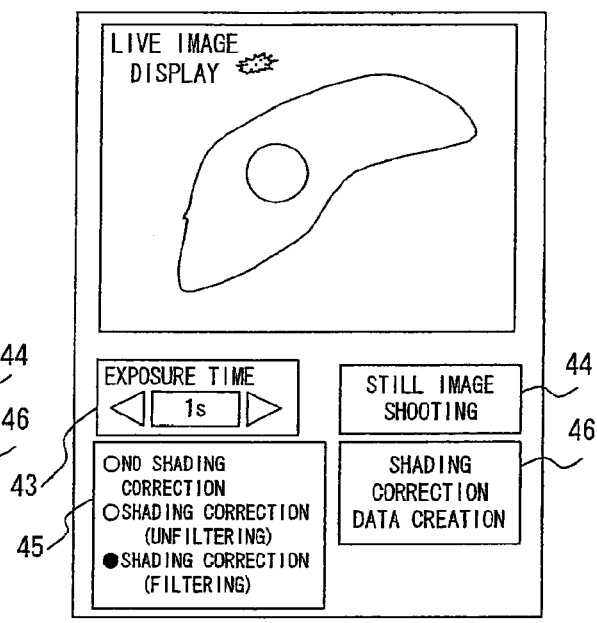

Firstly, if the shading correction is made by setting the shading correction setting button 45 to "shading correction (unfiltering)", there may be cases where one defective portion 48-2 of the dirt, the blemish disappears, but the other defective portion 48-i of the dirt, the blemish is emphasized and becomes more conspicuous as a defective portion 48-1' as shown in FIG. 9C.

In such a case, it is desirable to remove the emphasized defective portion 48-1 of the dirt, the blemish, etc. from the correction data, and to leave the defective portion 48-2 of the dirt, the blemish, etc., which disappears with the correction process, in the correction data. Namely, the shading correction process is executed by using the above described specified-region-filtered shading correction data, whereby the correction process can be executed by erasing one defective portion 48-2 of the dirt, the blemish, etc. without emphasizing the other defective portion 48-1 of the dirt, the blemish, etc.

As described above, according to this preferred embodiment, the operator of the microscopic image capturing apparatus 10 can execute a suitable shading correction process implementing a great-looking image by selecting a defective portion which can or cannot be erased with the correction, even if defective portions of dirt, a blemish, a smudge, etc., which have different natures and are superposed on an observation image displayed on the monitor 29. As a result, a sample image having higher quality can be obtained.

Third Preferred Embodiment

A third preferred embodiment is described next. Also a configuration of a microscopic image capturing apparatus according to the third preferred embodiment is the same as those shown in FIGS. 4 and 5. Note that, however, a shading correction process is different from those in the first and the second preferred embodiments.

FIG. 10A, exemplifies a shading correction data creation initial operation screen in this preferred embodiment, whereas FIG. 10B exemplifies a light-image-with-sample screen after the shading correction process in this preferred embodiment is executed.

As shown in FIG. 10A, on the shading correction data creation initial operation screen 56 in this embodiment, a correction factor input part 57 is displayed in addition to an exposure time adjustment button 43, a still image shooting button 44, a shading correction setting button 45, and a shading correction creation button 46, which are represented in the first or the second preferred embodiment, in an operation input region displayed below a corrected live image screen 54-4. In the correction factor input part 57, a correction factor input window 58 for inputting a correction factor is provided.

In the correction factor input window 58 of the correction factor input part 57 on the shading correction data creation initial operation screen 56, a correction factor K1 which corrects shading correction data can be set. When the correction factor K1 is input to the correction factor input window 58 of the correction factor input part 57, shading correction data stored in the correction data storing unit 35 of the digital camera 12 is replaced, namely, corrected with the following equation (1).

$$C'xy=1+K1(Cxy-1) \quad (1)$$

where Cxy is correction data of each pixel before being corrected, and C'xy is correction data of each pixel after being corrected.

In FIG. 10A, "1.0" is displayed as the correction factor K1 in the correction factor input window 58 of the correction factor input part 57. This indicates that C'xy=Cxy, namely, shading correction data is not corrected. Additionally, the corrected live image screen 54-4 displayed on the shading correction data creation initial operation screen 56 indicates a corrected live image screen corrected with shading correction data which is not corrected.

On the corrected live image screen 54-4 corrected with the shading correction data which is not corrected, defective portions 48 (48-1, 48-2) caused by dirt, a blemish, a smudge, etc. are displayed conspicuously from the sample 41.

In such a case, on the shading correction data creation initial operation screen 56 in this embodiment, for example, "0.8" is input as the correction factor K1 in the correction factor input window 58 of the correction factor input part 57 as shown in FIG. 10B. As a result, shading correction data stored in the correction data storing unit 35 of the digital camera 12 is rewritten and corrected.

An operator of the microscopic image capturing apparatus 10 determines an optimum value of the correction factor K1 by variously adjusting the correction factor K1 input to the correction factor input window 58 while viewing the display on the corrected live image screen 54-4 on the shading correction data creation initial operation screen 56.

Then, the image to which the shading correction is made with the shading correction data corrected, for example, with the correction factor "0.8" as described above is displayed as the corrected live image screen 54-5 as shown in FIG. 10B. On the corrected live image screen 54-5 shown in FIG. 10B, shading (characteristic?) for the entire image somewhat remains, but the defective portions 48 caused by the dirt, the blemish, etc. become inconspicuous.

The correction process for shading correction data in this embodiment is also applicable to shading correction data that is created without removing dirt, a blemish, etc. in a specified range in the second preferred embodiment.

As described above, an operator of the microscopic image capturing apparatus 10 can adjust shading correction data with a correction factor in this preferred embodiment. Therefore, a shading correction can be made under an optimum condition implementing a great-looking image by adjusting the amount of correction of shading correction data so as to make a defective portion of dirt, a blemish, etc. inconspicuous while somewhat allowing shading for the entire image, if the defective portion which is caused by the dirt, the blemish, the smudge, etc. and superposed on an observation image on the corrected live image screen displayed on the monitor 29 is conspicuous.

Fourth Preferred Embodiment

A fourth preferred embodiment is described next. Also a configuration of a microscopic image capturing apparatus according to the fourth preferred embodiment is the same as those shown in FIGS. 4 and 5. This preferred embodiment avoids a problem that an increase in noise, which appears after a shading correction process is made due to an increase in shading correction data, occurs in the above described conventional technique, and attempts to obtain a more satisfactory image implementing a greater-looking image.

Figure 11A:
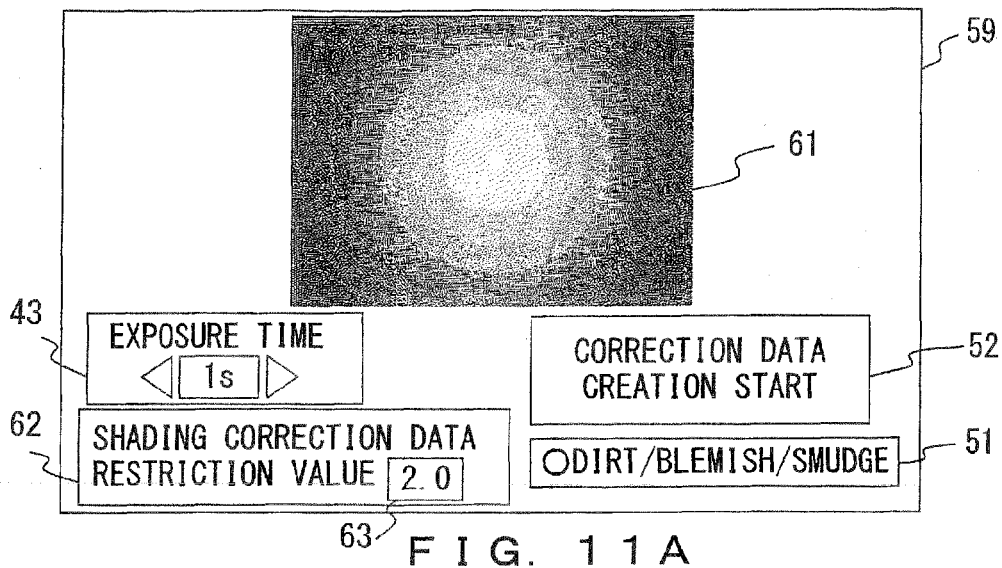
FIGS. 11A, 11B, and 11C are schematics explaining a shading correction method suppressing an increase in noise, which appears after a shading correction is made, in a microscopic image capturing apparatus according to a fourth preferred embodiment.
Figure 11B:
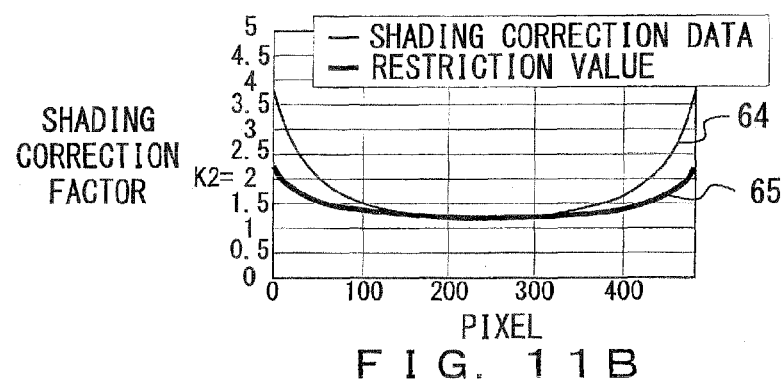
Figure 11C:
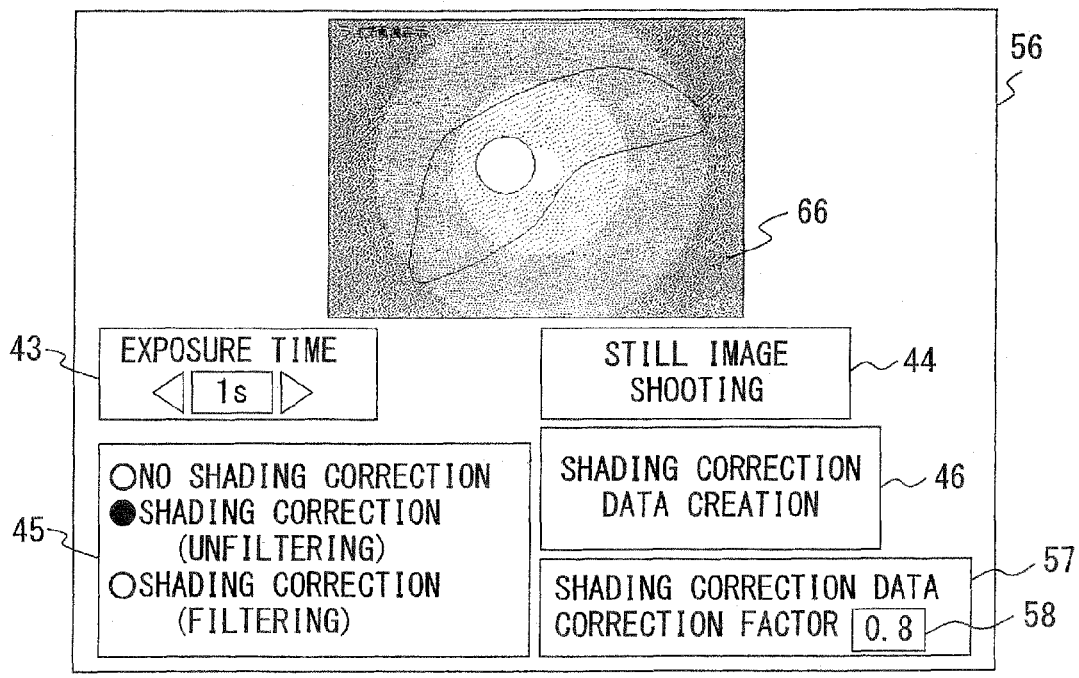

FIGS. 11A, 11B, and 11C explain a shading correction method suppressing an increase in noise, which appears after a shading correction is made, in the microscopic image capturing apparatus according to the fourth preferred embodiment. FIG. 11A exemplifies a screen on which shading correction data is created.

On the shading correction data creation execution screen 59 shown in FIG. 11A, a restriction value input part 62 and its restriction value input window 63 are displayed in addition to an exposure time adjustment button 43, a check button 51 for selecting whether or not to remove dirt, a blemish, etc., and a correction data creation start button 52 for instructing the start of creation of correction data in an operation input region below a light-image-without-sample screen 61. In the restriction value input window 63, a restriction value factor K2 for restricting the maximum value of shading correction data can be set.

The light-image-without-sample screen 61 on the shading correction data creation execution screen 59, which is referred to in this embodiment, shows an example where shading in a marginal portion is relatively strong in comparison with brightness in a central portion. This shows an example of a light-image-without-sample screen in a state similar to the light-image-without-sample screen shown in FIG. 2A, and the signal level of the light image shown in FIG. 2D.

FIG. 11B shows pixel positions (for example, D-D' shown in FIG. 6B, or E-E' shown in FIG. 6C) in one main scanning direction among sub-scanning directions on a horizontal axis, and shading correction data for the pixel values in the pixel positions, and shading correction data after being corrected on a vertical axis. In the example shown in FIG. 11B, shading correction data 64 is normal shading correction data for the light-image-without-sample screen 61 shown in FIG. 11A. Since the shading in a marginal portion of the light-image-without-sample screen 61 shown in FIG. 11A is relatively strong in comparison with brightness in a central portion, the data exhibits a curve which sharply rises at both of left and right ends, and its maximum values is "3.6".

If the restriction value K2 ("2.0" in this embodiment) is input/set in the restriction value input window 63 of the restriction value input part 62 on the shading correction data creation execution screen 59 shown in FIG. 11A, an arithmetic operation using the above described restriction value K2 is performed for the shading correction data 64 once stored in the correction data storing unit 35 of the digital camera 12, so that shading correction data after being restricted is calculated.

In the arithmetic operation of the shading correction data after being restricted, the restriction value, each pixel value of the shading correction data before being restricted (the shading correction data 64 once stored in the correction data storing unit 35), its maximum value, and each pixel value of the shading correction data after being restricted are defined to be "K2", "Cxy", "Cmax", and "C'xy" respectively, and "C'xy" is calculated with the following equation.

$$C'xy=1+(K2-1)(Cxy-1)/(Cmax-1) \quad (2)$$

The shading correction data after being restricted 65 shown in FIG. 11B is calculated with the above provided equation (2) by setting K2 to 2.0.

Consequently, as shown in FIG. 11B, the shading correction data after being restricted 65 exhibits a gentle curve as a whole, and restricts the above described maximum value to "2.0" in contrast with the maximum value "3.6", which sharply changes at both ends of the shading correction data before being restricted 64. The above described shading correction data before being corrected 65 is replaced with the newly calculated shading correction data after being restricted 65, and the replaced data is stored in the storing unit 35.

In this way, if the correction data creation start button 52 is pressed on the shading correction data creation execution screen 59 shown in FIG. 11A in this embodiment, the above described shading correction data after being corrected 65 is read from the correction data storing unit 35, and the read shading correction data after being corrected 65 is set in the shading correction processing unit 36, so that the shading correction is made.

As a result, as shown in FIG. 11C on the shading correction data creation initial operation screen 56, the shading somewhat remains in the margin of the central portion, but the screen becomes a suitable live image screen 66 implementing a great-looking image, whose noise is suppressed and inconspicuous in contrast with an unrestricted image (not shown).

As described above, according to this preferred embodiment, correction data can be restricted. As a result, even when shading correction data in the margin becomes large due to a significant decrease in a marginal amount of light, an increase in noise in the marginal portion can be suppressed, and a suitable live image screen implementing a great-looking image can be obtained.

In this embodiment, an operator of the microscopic image capturing apparatus 10 may be allowed to arbitrarily select whether to make the shading correction by setting the restriction value K2 on the shading correction data creation execution screen 59 shown in FIG. 11A as described above, or select whether or not to make the shading correction by, setting the correction coefficient K1 while viewing the display screen in a similar manner as in the third preferred embodiment as indicated by the shading correction data creation initial operation screen 56 shown in FIG. 11c.

Additionally, when shading correction data is created with a restriction value, the shading correction data may not be restricted, and a message notifying that Cmax>K2 may be displayed on the display screen if Cmax>Xs as a result a comparison between Cmax and K2.

Furthermore, when the correction process is executed by using shading correction data created without being restricted as described above, the message notifying that Cmax>K2 may be displayed on the display screen, or a result that the maximum value Cmax of the shading correction data is equal to or larger than the restriction value K2 may be recorded in a header portion of an image file when the image data is recorded in the image file on the side of the PC 27.

In this way, when noise in a marginal portion of a shot sample image is large, it is easily proved that the noise is resultant from the shading correction.

FIGS. 12A, 12B, and 12C show modification examples of shading correction data creation when shading correction data in a marginal portion becomes large due to a significant decrease in a marginal amount of light as described above.

FIGS. 12A, 12B, and 12C show the examples where correction data of a target region in a marginal portion of an image, whose Cmax>K2 as a result the comparison between Cmax and K2, is padded with 0 when shading correction data is created in the above described fourth preferred embodiment.

In FIG. 12A, when a portion of Cxy≦K2 is assumed to be the inside of a region indicated by a circle 68 shown in FIG. 12A, data outside a rectangle (an operator of the microscopic image capturing apparatus 10 can arbitrarily select either of a regular tetragon and a rectangle) inscribed in the circle 68 in shading correction data is replaced with "0" as shown in FIG. 12B, or data outside an octagon inscribed in the circle 68 is replaced with "0" as shown in FIG. 12C, if the shading correction data in the marginal portion becomes large due to a significant decrease in the marginal amount of light on the light-image-without-sample screen, which is to be corrected, in the shading correction data 67 (represented by using as a substitute an image where the largeness/smallness of each pixel value is represented by light and dark in the following description of the preferred embodiments including this embodiment), which is calculated from the data of the light-image-without-sample screen. As a matter of course, data outside the circle 68 may be replaced with "0".

If the shading correction is made to the light-image-with-sample screen by using such shading correction data, a portion where the shading is large is masked and invisible, and the effective range of the image becomes narrow, although this is not particularly shown. However, it becomes image data of high quality, which implements a great-looking image in that range.

Fifth Preferred Embodiment

A fifth preferred embodiment is described next. Also a configuration of a microscopic image capturing apparatus according to the fifth preferred embodiment is the same as those shown in FIGS. 4 and 5. In this preferred embodiment, a region to which a shading correction is made can be specified.

FIGS. 13A and 13B respectively show an example of a shading correction data creation execution screen in the fifth preferred embodiment. These figures respectively show created shading correction data.

FIG. 13A shows a case where shading correction data for correcting only a rectangular region 71 in the periphery of a defective portion on a light-image-without-sample screen 69, which is displayed on the shading correction data creation execution screen 49, is created.

In this embodiment, the rectangular region 71 in the periphery of the defective portion is first specified with a pointing device such as a mouse, etc. as shown in FIG. 13A. Then, shading correction data is created for the image data of the light-image-without-sample screen 69. As the shading correction data thus created, shading correction data is calculated for the data portion corresponding to the inside of the rectangular region 71 with a normal method, and the data portion except for the rectangular region 71 is padded with 1 as shown in FIG. 13C.

At this time, the correction data significantly varies in a boundary of the rectangular region 71. Therefore, the shading correction data which is shown in FIG. 13C and multiplied, for example, by an average value filter of 3×3 is stored in the correction data storing unit 35 of the digital camera 12 as shading correction data to be actually used. In this way, shading correction data that reduces a change in the correction data in the specified region can be created.

FIG. 13B shows another example of the case where a region is specified. This is an example where shading correction data, which corrects only four corners 73 (73-1, 73-2, 73-3, 73-4) of an image whose shading (characteristic?) becomes especially large due to a decrease in a marginal amount of light on the light-image-without-sample screen 72, is created.

Also in this case, the four corners 73 on the light-image-without-sample screen 72 are partitioned, for example, into triangles and specified with a pointing device such as a mouse, etc. as shown in FIG. 13B. Then, shading correction data is created for the image data of the light-image-without-sample screen 72. As the shading correction data thus created, shading correction data is calculated with a normal method for data portions corresponding to the insides of the four corners 73, and a data portion except for the four corners 73 is padded with 1.

Also in this case, the shading correction data calculated as shown in FIG. 13D is multiplied, for example, by the average value filter of 3×3, and stored (?) as the final shading correction data (to be actually used) in a similar manner as in the cases shown in FIGS. 13A and 13C.

As described above, according to this preferred embodiment, an operator of the microscopic image capturing apparatus 10 can correct only a portion that he or she desires to correct. Therefore, the quality of an entire observation image can be improved without increasing noise in a focused region, because the operator normally focuses a region where shading is small.

Sixth Preferred Embodiment

A sixth preferred embodiment is described next. In the sixth preferred embodiment, a configuration of a microscope that configures a microscopic image capturing apparatus is the same as that shown in FIG. 4.

FIG. 14 is a block diagram showing a rough configuration of a digital camera that configures the microscopic image capturing apparatus according to the sixth preferred embodiment. The digital camera 75 shown in this figure is configured to comprise a dirt/blemish correction processing unit 76 at a stage succeeding a shading correction processing unit 36 in the configuration of the digital camera 12 shown in FIG. 5. Other constituent elements are the same as those in FIG. 5. Accordingly, the same constituent elements as those in FIG. 5 are denoted with the same reference numerals.

In this preferred embodiment, a shading correction is made by separating defective portion component data of dirt, a blemish, etc. from shading correction data, and by correcting the separated defective portion component data of the dirt, the blemish, etc. with a gain different from that of remaining component data to be shaded. A shading correction data creating method in this embodiment is described first.

FIGS. 15A, 15B, 15C, 16A, 16B, and 16C are schematics respectively explaining the shading correction data creating method in this embodiment. Considered first is a case where defective portions 81 (81-1, 81-2) of dirt, and shading 82 are superposed and observed on an observation image of a sample 79 as indicated by a light-image-with-sample screen 78 on a shading correction data creation initial operation screen 77 shown in FIG. 15A.

In an operation input region below the light-image-with-sample screen 78 on the shading correction data creation initial operation screen 77 shown in FIG. 15A, a shading correction setting input field 83 having a simple configuration different from the above described ones, and a dirt/blemish correction gain input field 84 are displayed in addition to three buttons such as an exposure time adjustment button 43, a still image shooting button 44, and a shading correction creation button 46, which are displayed similarly to the operation input region on the shading correction data creation initial operation screen described so far.

Figure 15B:
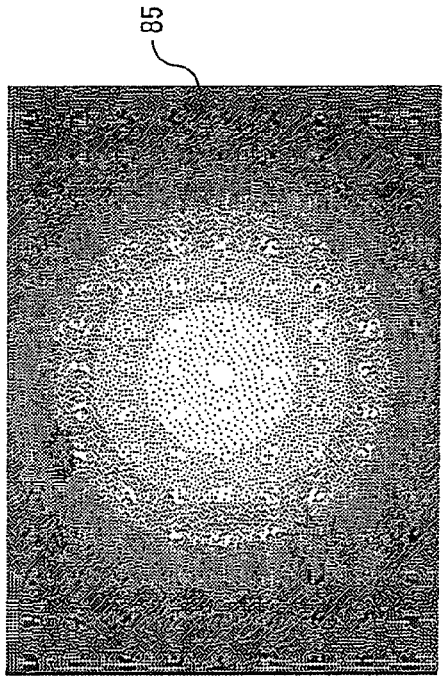
FIGS. 15A, 15B, and 15C are schematics (No. 1) explaining a shading correction data creating method in the sixth preferred embodiment.
Figure 15C:
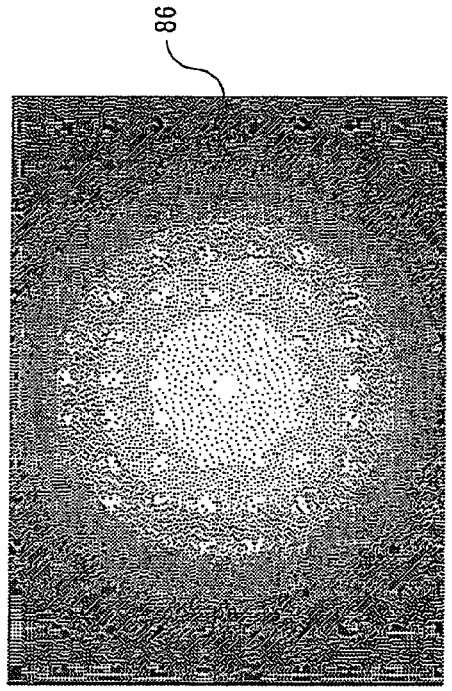
Figure 15A:
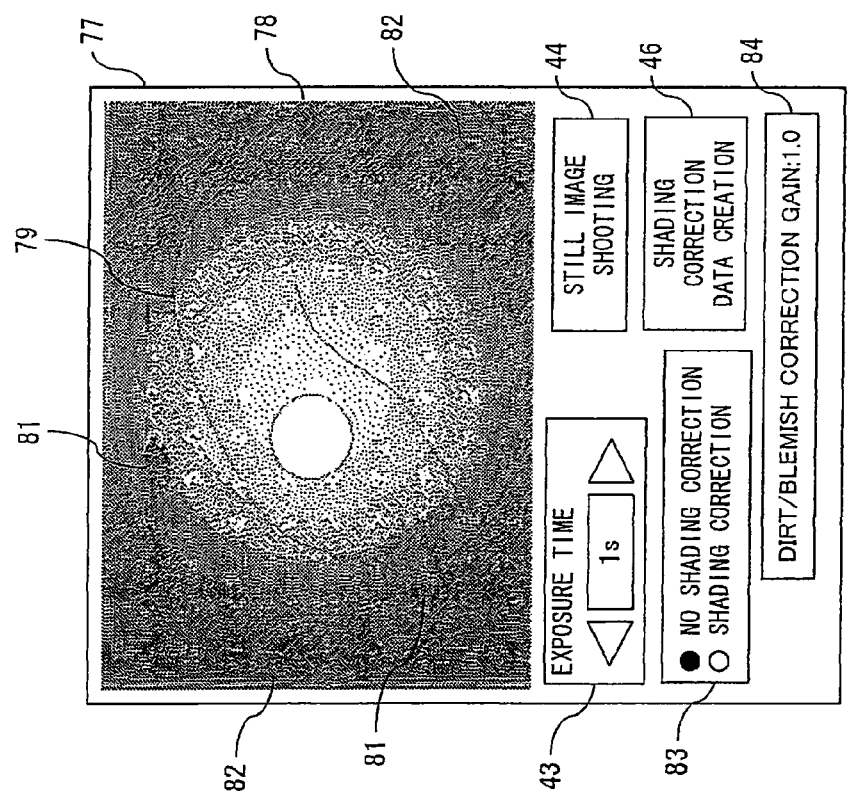
Figure 16A:
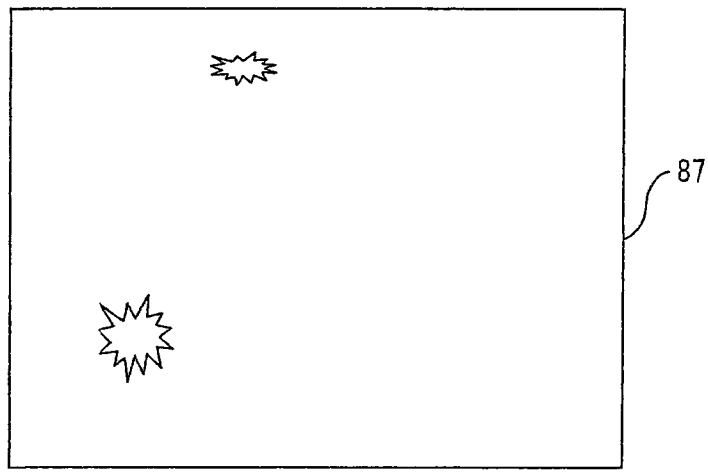
FIGS. 16A, 16B, and 16C are schematics (No. 2) explaining a shading correction data creating method in the sixth preferred embodiment.
Figure 16B:
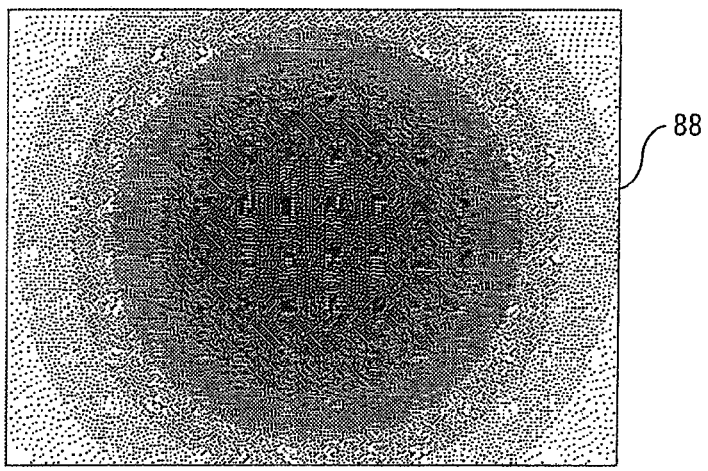
Figure 16C:
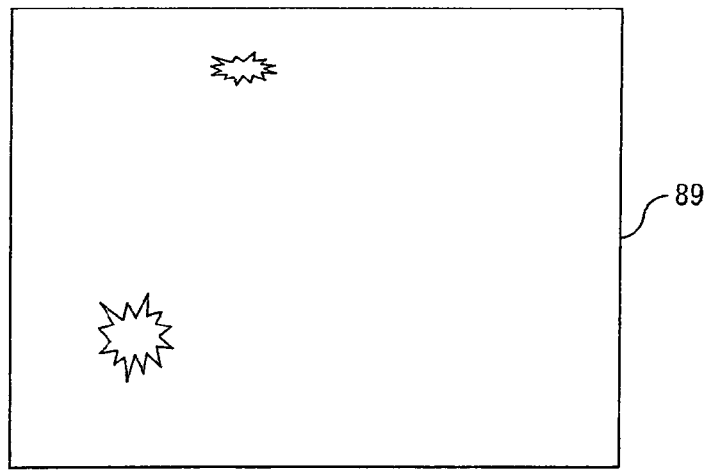

The sample 79 is removed from the microscope in the above described state where the defective portions 81 of the dirt and the shading 82 are superposed on the observation image of the sample 79, and the shading correction data creation button 46 is pressed in the state of the light-image-without-sample screen 85 shown in FIG. 15B, so that shading correction data starts to be created. At this time, the shading correction data is created with the following procedures in this embodiment.

a: Removing the sample 76 from the microscope, and obtaining the image data of the light-image-without-sample screen 85, which is displayed on the display portion on the shading correction data creation initial operation screen 77 shown in FIG. 15A as described above.

b: Obtaining filtered image data 86 having only the shading component, which is shown in FIG. 15C by using a median filter for the obtained image data of the light-image-without-sample screen 85.

c: Obtaining extracted image data 87 having only the defective portion components, which is obtained by extracting only the defective portion components shown in FIG. 16A, by subtracting the filtered image data 86 shown in FIG. 15C from the image data of the light-image-without-sample screen 85 shown in FIG. 15B, or by dividing the image data of the light image screen without a same 85 by the filtered image data 86(???) for each pixel.

d: Obtaining filtered shading correction data 88 shown in FIG. 16B by performing a normal shading correction data creation operation for the filtered image data 86 shown in FIG. 15C.

e: Obtaining the defective portion component correction data 89 for the defective portion components of the dirt, the blemish, etc. shown in FIG. 16C by performing a normal shading correction data creation operation for the extracted image data 87 having only the defective portion components shown in FIG. 16A.

f: Storing the filtered shading correction data 88 shown in FIG. 16B, and the defective portion component correction data 89 of the dirt, the blemish, etc. shown in FIG. 16C in the shading correction data storing unit 35.

With the above described procedures, the creation and the storage processes of the filtered shading correction data 88 for the filtered image data, and the defective portion component correction data 89 for the image data having only the defective portion components of the dirt, the blemish, etc. are executed.

Figure 17B:
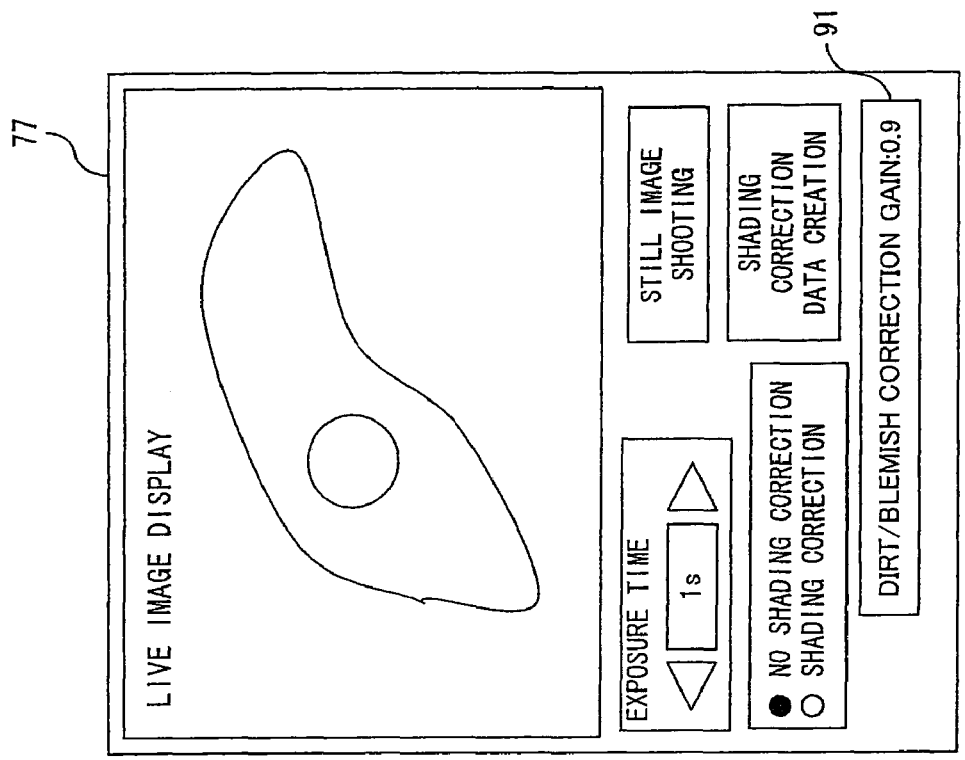
FIGS. 17A and 17B are schematic explaining a shading correction in the sixth preferred embodiment.
Figure 17A:
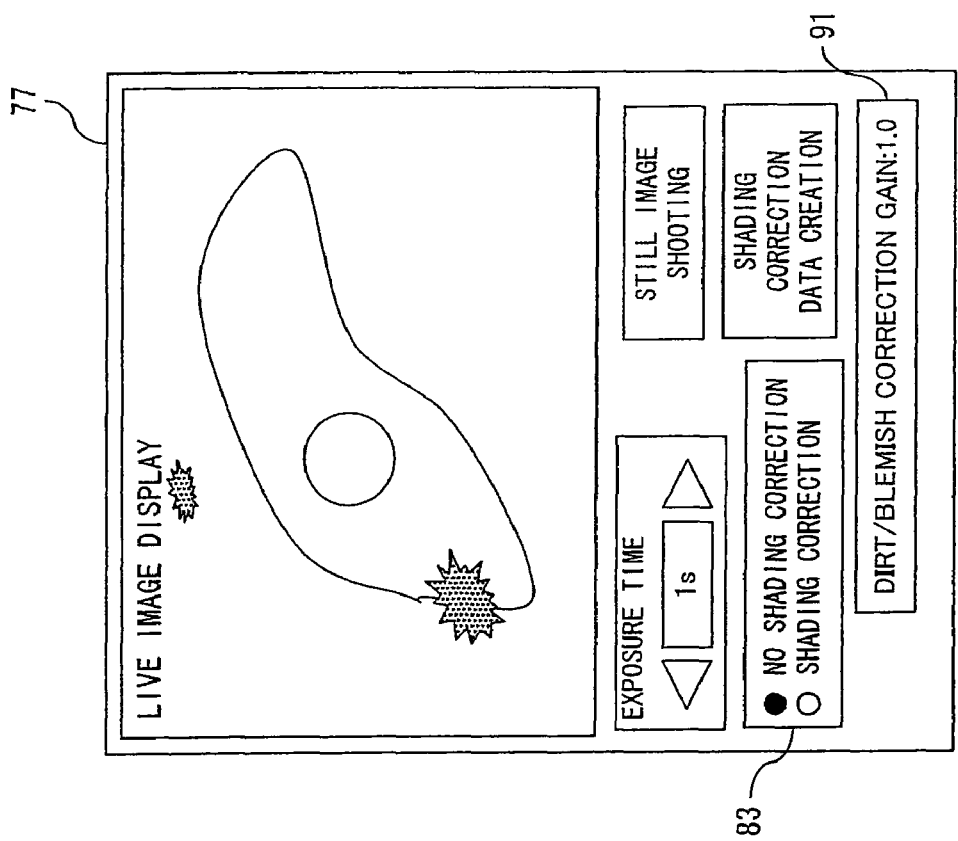

FIGS. 17A and 17B explain the shading correction in this embodiment, which is made by using the filtered shading correction data 88 and the defective portion component correction data 89, which are created and stored as described above.

If an operator of the microscopic image capturing apparatus 10 selects "shading correction" as indicated by the shading correction setting input field 83 in the operation input region 83 on the shading correction data creation initial operation screen 77 shown in FIG. 17A, the filtered shading correction data 88 and the defective portion component correction data 89 are read from the correction data storing unit 35. The read filtered shading correction data 88 and defective portion component correction data 89 are respectively set in the shading correction processing unit 36 and the dirt/blemish correction processing unit 76.

At this time, as the defective portion component correction data set in the dirt/blemish correction processing unit 76, a value obtained by multiplying the defective portion component correction data 89 by a dirt/blemish correction gain such as 0.9 is set as indicated by a dirt/blemish correction gain input field 91 in the operation input region on the shading correction data creation initial operation screen 77 shown in FIG. 17B.

The process in the dirt/blemish correction processing unit 76 is the same as that in the shading correction processing unit 36 except that correction data is different. Processing functions in the other constituent elements are similar to those in FIG. 5.

As described above, in this embodiment, if influence of a shading component and that of a dirt/blemish component on the observation image are different, namely, if a shading component disappears but a dirt/blemish component does not disappear when a shading correction is made by setting the dirt/blemish component correction gain to 1.0 as indicated by the dirt/blemish correction gain input field 91 in the operation input region on the shading correction data creation initial operation screen 77 shown in FIG. 17A, the dirt/blemish correction gain is changed to 0.9 or another suitable value as indicated by the dirt/blemish correction gain input field 91 shown in FIG. 17B, so that the dirt/blemish defective portion component as well as the shading component can be satisfactorily corrected as shown in FIG. 17B.

What is claimed is:

1. A microscopic image capturing apparatus comprising:
   a microscope which obtains a light image with a sample illuminated by a light source, which exists within a viewing field, and a light image without the sample, which is captured in a state of being only illuminated by the light source, with an objective lens arranged as opposed to the sample; and
   a digital camera which is attached to the microscope and captures the light images obtained by the microscope;
   wherein the digital camera comprises:
   an A/D converting unit which A/D-converts an image signal of each of the captured light images;
   a shading correction processing unit which executes a shading correction process for digital image data converted by the A/D converting unit;
   a correction data storing unit which stores shading correction data used when the shading correction process is executed by the shading correction processing unit; and
   a controlling unit;
   wherein the correction data storing unit stores first shading correction data obtained based on image data of the light image without the sample, which is acquired by capturing the light image without the sample with the digital camera, in correspondence with a selection of non-removing a defective portion, and second shading correction data obtained based on an image acquired by using a median filter for the image data of the light image without the sample, which is obtained by capturing the light image without the sample with the digital camera, in correspondence with a selection of removing a defective portion; and
   wherein the controlling unit sets selected shading correction data in the shading correction processing unit from the correction data storing unit in correspondence with an externally input selection of using one of the first and the second shading correction data, when the shading correction process is executed for a image data of the light image with the sample obtained by capturing the light image with the sample with the digital camera.

2. The microscopic image capturing apparatus according to claim 1, wherein:
   the correction data storing unit stores, as the second shading correction data, shading correction data obtained based on data of the light image without the sample with a region for which a median filter is specified not to be used for a screen of the light image without the sample obtained by shooting the light image without the sample with the image capturing unit.

3. The microscopic image capturing apparatus according to claim 1, wherein:
   the correction data storing unit stores a predetermined factor for modifying the first or the second shading correction data; and
   the controlling unit modifies the first or the second shading correction data based on the factor according to external specification.

4. A microscopic image capturing method comprising:
   capturing, through a microscope using a digital camera, a light image with a sample illuminated by a light source within a viewing field, and a light image without the sample, which is only illuminated by the light source, the light images being obtained with an objective lens of the microscope arranged as opposed to the sample illuminated by the light source;
   generating digital image data by A/D converting an image signal of each of the captured light images;
   storing, in a correction data storing device, first shading correction data obtained based on image data of the light image without the sample, which is acquired by capturing the light image without the sample with the digital camera, in correspondence with a selection of non-removing a defective portion, and second shading correction data obtained based on an image, which is acquired by using a median filter for the image data of the light image without the sample acquired by capturing the light image without the sample with the digital camera, in correspondence with a selection of removing a defective portion;
   reading from the shading correction data storing device the first or the second shading data, which is selected according to an externally input selection of using one of the first and the second shading correction data in the shading correction process; and
   executing a shading correction process by using the shading correction data read from the correction data storing device for the digital image data of the light image with the sample.

5. The microscopic image capturing method according to claim 4, wherein:
   the second shading correction data stored in the correction data storing device comprises shading correction data obtained based on data of the light image without the sample, for which the median filter is used, after a region for which the median filter is not used is set for a screen of the light image without the sample obtained by shooting the light image without the sample with the digital camera.

6. The microscopic image capturing method according to claim 4, further comprising:
   storing a predetermined factor for modifying the first or the second shading correction data in the correction data storing device, and modifying the first or the second shading correction data based on the factor according to external specification in the shading correction process.

7. A non-transitory computer-readable storage medium having a program stored thereon for controlling a computer to perform processes comprising:
- storing, in a correction data storing device for a digital camera, first shading correction data obtained based on image data of a light image without a sample, which is acquired by capturing the light image without the sample via a microscope with the digital camera, in correspondence with a selection of non-removing a defective portion, and second shading correction data obtained based on an image, which is acquired by using a median filter for the image data of the light image without the sample acquired by capturing the light image without the sample via the microscope with the digital camera, in correspondence with a selection of removing a defective portion;
- reading from the shading correction data storing device the first or the second shading data, which is selected according to an externally input selection of using one of the first and the second shading correction data in the shading correction process; and
- executing a shading correction process by using the shading correction data read from the correction data storing device for digital image data of a light image with a sample captured via the microscope with the digital camera with the sample illuminated by a light source within a viewing field;
- wherein the light images are obtained with an objective lens of the microscope arranged as opposed to the sample illuminated by the light source; and
- wherein an image signal of each of the captured light images is A/D converted to obtain digital image data.

8. The computer-readable storage medium according to claim 7, wherein the program further controls the process to comprise:
- storing, as the second shading correction data, in the correction data storing device shading correction data which is obtained based on data of the light image without the sample, for which a median filter is used, after a region for which the median filter is not used is set for a screen of the light image without the sample obtained by shooting the light image without the sample with the image capturing unit.

9. The computer-readable storage medium according to claim 7, wherein the program further controls the process to comprise:
- storing a predetermined factor for modifying the first or the second shading correction data in the correction data storing device, and
- modifying the first or the second shading correction data based on the factor according to external specification in the shading correction process.

* * * * *